(12) United States Patent
Bilbrey et al.

(10) Patent No.: US 7,080,122 B2
(45) Date of Patent: Jul. 18, 2006

(54) SYSTEM AND PROCESS FOR UPDATING ELECTRONIC MESSAGING ACCOUNTS

(75) Inventors: George Bilbrey, Lafayette, CO (US); Kevin O'Connell, Denver, CO (US); Eric Kirby, Boulder, CO (US); John Kevin Hartley, Boulder, CO (US); Andrew Michael Sautins, Boulder, CO (US)

(73) Assignee: Return Path, Inc., New York, NY (US)

( * ) Notice: Subject to any disclaimer, the term of this patent is extended or adjusted under 35 U.S.C. 154(b) by 811 days.

(21) Appl. No.: 09/921,955

(22) Filed: Aug. 3, 2001

(65) Prior Publication Data

US 2002/0103932 A1 Aug. 1, 2002

Related U.S. Application Data

(60) Provisional application No. 60/246,357, filed on Nov. 7, 2000, provisional application No. 60/223,379, filed on Aug. 7, 2000.

(51) Int. Cl.
G06F 15/16 (2006.01)

(52) U.S. Cl. .................... 709/206; 709/206; 709/245; 709/207

(58) Field of Classification Search ................ 709/206, 709/245, 207
See application file for complete search history.

(56) References Cited

U.S. PATENT DOCUMENTS

| | | | | |
|---|---|---|---|---|
| 5,493,564 | A * | 2/1996 | Mullan | 370/351 |
| 6,108,688 | A * | 8/2000 | Nielsen | 709/207 |
| 6,405,243 | B1 * | 6/2002 | Nielsen | 709/206 |
| 6,427,164 | B1 * | 7/2002 | Reilly | 709/206 |
| 6,438,583 | B1 * | 8/2002 | McDowell et al. | 709/206 |
| 6,564,264 | B1 | 5/2003 | Creswell et al. | |
| 6,615,241 | B1 * | 9/2003 | Miller et al. | 709/206 |
| 6,654,746 | B1 * | 11/2003 | Wong et al. | 707/10 |
| 6,654,779 | B1 * | 11/2003 | Tsuei | 709/206 |
| 6,654,789 | B1 * | 11/2003 | Bliss et al. | 709/206 |
| 2001/0037463 | A1 * | 11/2001 | Salta | 713/201 |
| 2001/0047391 | A1 * | 11/2001 | Szutu | 709/206 |
| 2001/0049745 | A1 * | 12/2001 | Schoeffler | 709/245 |
| 2001/0054041 | A1 * | 12/2001 | Chang | 707/10 |
| 2002/0016857 | A1 * | 2/2002 | Harari | 709/245 |

OTHER PUBLICATIONS

Affidavit of William C. Thomson, 3 pages, Jan. 13, 2005.

(Continued)

*Primary Examiner*—John Follansbee
*Assistant Examiner*—Ashok B. Patel
(74) *Attorney, Agent, or Firm*—Blank Rome LLP

(57) ABSTRACT

The present invention provides various embodiments of a system and a process for updating e-mail and other forms of electronic messages via a change of address network. In one embodiment, the system includes a Sponsor Database (containing mailbox/address information utilized by a Sponsor to send information to a recipient) connected to a Network Server which receives updates of mailbox/address changes from recipients and, in certain embodiments, other Sponsors. In other embodiments, a Reconnection Manager facilitates the exchange of information between the Sponsors and the Network Server. Also, one embodiment of the process provides updated mailbox/address information to those Sponsors which a recipient has previously identified to the Network Server as being acceptable for receiving the update information. The invention also provides various embodiments by which a recipient may register change of address information with the Network Server and processes utilized by the Network Server to verify such registrations are valid.

6 Claims, 35 Drawing Sheets

OTHER PUBLICATIONS

"E-mail database provides a Fresh take on change-of-address information", Mass High Tech—The Journal of New England Technology, May 6, 2004, 2 pages.
EmailChange.com as of May 30, 1997, 5 pages.
Find me-mail.com as of Apr. 15, 1997, 10 pages.
Greybook.com as of Dec. 1, 2000, 6 pages.
Search Result for EmailChange.com Domain Name, 1 page as of Dec. 17, 2004.
E-Mail Addresses Registered on EmailChange.Com as of Jan. 30, 1997, 3 pages.
E-Mail Addresses Registered on EmailChange.Com as of May 12, 1997, 2 pages.
Searches performed on EmailChange.Com as of May 12, 1997, 15 pages.

* cited by examiner

| ACTIVITY LOG | _ ☐ ✕ |
|---|---|

REFRESH | CONNECT | UPDATE |

CLOSE

PRINT

HELP

DATE: 2/14/00  TIME 10:20:00 PM
REFRESH FUNCTION COMPLETE – INCLUDES MORE DETAIL..................

DATE: 2/14/00  TIME 11:12:00 PM
CONNECT FUNCTION COMPLETE – INCLUDES MORE DETAIL..................

DATE: 2/15/00  TIME 11:12:00 PM
CONNECT FUNCTION COMPLETE – INCLUDES MORE DETAIL..................

CLEAR

Dear Veripost User:

Thank you for submitting your e-mail address change to

Veripost.

PLEASE CLICK THE LINK BELOW TO COMPLETE YOUR REGISTRATION: _____ 1912 http://www.veripost.net/adm?z=y547E67cPgw=8aJb6zwxJPFbPm4bET2CTQ==

Clicking the above link officially activates your service

With Veripost, allowing you to keep in touch with contacts.

This is a free service.

You have registered the following change of address:                                      1914

- Old Address: brothermfc4601@yahoo.com

- New Address: brothermfc4602@yahoo.com

If the information is not correct, please click on the link below to make changes.

http://www.veripost.net/?old_email=brothermfc4601@yahoo.com&new_email=brothermfc4602@yahoo.com We look forward to keeping you connected via e-mail.

Sincerely,

Veripost Customer Service support@veripost.net.

Veripost, Your E-Mail Change of Address Solution http://www.veripost.net

---

Troubleshooting

If you did not submit this e-mail change of address request,

Please cancel the unauthorized request by clicking the link below.

http://www.veripost.net/stopcoa?z=y547E67cPgw=7vtabONFGHCoqt4yFTB6fw==

Trouble clicking the links? Please copy and paste them into your web browser.

---

If you have any questions, please do not reply to this message. Instead, please send any questions to mailto:support@veripost.net

FIGURE 19C

Veripost

| HOW IT WORKS | PRIVACY PROMISE | ADDRESS MANAGER | FAQ | ABOUT US |

Notify Friends | E-mail Finder | Add Old Addresses | E-Change Checklist | Respond to Requests | View History

Privacy Options

Thank You – Your account has been activated.

Your Account

New Address –
brothermfc4602@yahoo.com

Old Address –
brothermfc4601@yahoo.com
*Service begins on*
*August 4, 2001*
brothermfc4600@yahoo.com Please select a privacy option ◉ Streamlined * -

Only release my current e-mail address to requesters who already know my old e-mail address.

◉ Notification -

Send me an e-mail every time someone requests my current e-mail address. I will decide how to respond on a case-by-case basis.

[Submit]

*Note: When changing your privacy option from *notification* to *streamlined*, any pending request will be automatically updated.

- Change Your Privacy Option.
Your current
Privacy option is:
Notification

How it works · Privacy Promise · Address Manager · Frequently Asked Questions · About Us · Terms of Use
Copyright 2000, 2001 Veripost Inc. All Rights Reserved 1916 — (points to brothermfc4602@yahoo.com)
1918 — (points to brothermfc4600@yahoo.com)
1915 —

FIGURE 19D

Dear Veripost User:

Thank you for submitting your e-mail address change to

Veripost.

IMPORTANT: AN E-MAIL HAS BEEN SENT TO YOUR NEW ADDRESS.

To activate your service, you must click the link sent in that e-mail.

ALSO, PLEASE VERIFY YOUR CHANGE OF ADDRESS FROM THIS

ADDRESS BY CLICKING THE LINK BELOW.

http://www.veripost.net/adm?z=y547E67cPgw=SkobsnEKFTYQ3Jxy874wug==

You have registered the following change of address:

- Old Address: brothermfc4601@yahoo.com

- New Address: brothermfc4602@yahoo.com

If the information is not correct, please click on the link below to make changes.

http://www.veripost.net/?old_email=brothermfc4601@yahoo.com&new_email=brothermfc4602@yahoo.com Thank you for using our service.

Sincerely,

Veripost Customer Service support@veripost.net.

Veripost, Your E-Mail Change of Address Solution http://www.veripost.net

---

Troubleshooting

If you did not submit this e-mail change of address request,

Please cancel the unauthorized request by clicking the link below.

http://www.veripost.net/stopcoa?z=y547E67cPgw=7vtabONFGHCogt4yFTB6fw==

Trouble clicking the links? Please copy and paste them into your web browser.

---

If you have any questions, please do not reply to this message. Instead, please send any questions to mailto:support@veripost.net

FIGURE 19F

SYSTEM AND PROCESS FOR UPDATING ELECTRONIC MESSAGING ACCOUNTS

CROSS-REFERENCE TO RELATED APPLICATIONS

The present invention claims priority to and incorporates, in its entirety, by reference the subject matter disclosed in U.S. Provisional Patent Application Ser. No. 60/223,379, filed on Aug. 7, 2000 entitled "Cooperative Email Address Change and Update Process," and in U.S. Provisional Patent Application Ser. No. 60/246,357, filed on Nov. 7, 2000 entitled "System and Process for Updating Electronic Messaging Accounts."

FIELD OF THE INVENTION

The present invention relates generally to the field of providing automated electronic address updating services. More specifically, the present invention relates to an electronic address updating service that provides sponsors of electronic messages with current addresses for recipients of such messages. The present invention also relates to electronic subscription management services.

BACKGROUND OF THE INVENTION

As is commonly appreciated, today's economy relies in significant part upon the prompt and accurate delivery of various forms of electronic messages from sponsors to their intended recipients. Electronic messages may include or utilize information pertaining to how to contact or communicate with a recipient, information for personally identifying an individual or individuals or characteristics of an individual or individuals, demographic information, psychographic information, and other information. Electronic messaging is often provided in the form of e-mails, pages, and voice messages which are sent to a "mailbox" (i.e., an address provided on an electronic network) associated with a recipient. The mailbox is also commonly used by the recipient to send replies and other messages to such sponsors.

Additionally, since today's electronic marketplace is full of great volatility and mobility, electronic messaging service providers are often interchanged and substituted for by moving and/or temperamental recipients. Further, since recipients often receive messages from hundreds of individuals and sponsors on a weekly, if not daily basis, the volume of messages received often discourages a recipient from notifying the various sponsors of their new address when the recipient changes mailboxes/addresses. Additionally, due to the large volume of electronic messages a recipient commonly receives, it is nearly impossible for the recipient to notify all the sponsors from whom the recipient receives electronic messages of their new mailbox/address. Further compounding the tasks faced by sponsors and recipients with updating mailboxes/addresses is that, unlike the United States Postal Service where a recipient is usually associated with only one personal mailbox (i.e., their home mailbox/address), recipients of electronic messages often are associated with numerous mailboxes/addresses.

For example, a recipient fully integrated into today's electronic communities commonly is associated with a home e-mail address, a mobile telephone/voice messaging mailbox/address, a work related e-mail address, a personal/home voice messaging mailbox/address, a pager mailbox/address, a work related voice messaging mailbox/address, an instant messaging mailbox, a cable or satellite dish mailbox, and various other mailboxes/addresses through which the recipient receives information on specific topics. When such a recipient changes jobs and/or moves to a different city, numerous mailboxes/addresses may need updating. Since the recipient probably does not provide an identification of all the various mailboxes/addresses to all the sponsors from whom the recipient receives electronic messages, there is no single process or system available for letting recipients decide and automatically notify sponsors of changes to mailboxes/addresses.

Therefore, a system and process is needed that notifies sponsors when a recipient's mailbox/address has changed and to provide the location/address of the new mailbox. Further, since recipients often do not desire all sponsors or others to necessarily be informed of their new mailbox/address, a system is needed which allows a recipient to select which sponsors are allowed to receive the new mailbox/address information. Similarly, since sponsors generally consider their lists of recipients for electronic messaging to be trade secrets or otherwise worthy of protecting, such sponsors generally do not like to provide clearing houses, network message routing services, or others with such complete lists of their client base. Therefore, a system is needed that enables recipients to identify and notify sponsors when their mailbox/address has changed without requiring a provider of such service to actually access a sponsor's confidential or trade secret protected lists.

SUMMARY OF THE INVENTION

The present invention provides a system and process that is utilized to update e-mail addresses and information relating to e-mail subscriptions provided between an "E-mail Address Change Network" (EACN) (which may be implemented on a server, networks of servers, or a network which are collectively referred to hereinafter as a "Network Server") and sponsors subscribing to such a network. As used throughout this specification a "Sponsor" includes any entity that provides messages in electronic form (for example, an e-mail message, a voice message, a facsimile message, or a paging message) regardless of the format or content of the message (i.e., the message may be in an audio, video, text, graphic, or any other format) to a recipient (i.e., a person designated to receive a message from the sponsor) on a recurrent basis. For example, a Sponsor would include a news group such as ZDNet® or other Internet based providers of information, or a friend or associate of the recipient (who frequently communicates with the recipient electronically). However, a Sponsor preferably would not include a person or entity who does not repeatedly communicate with the recipient. As such, an electronic "cold caller", who transmits electronic messages to a randomly assigned list of recipients, would not fall within the definition of "Sponsor." Those skilled in the art, however, realize that the present invention may be configured to update mailboxes/addresses for any sender or receiver of electronic messages, in any format, via any communications medium(s). Further, throughout this description the terms "mailbox" and "address" are to be construed as designating the singular and/or plural (i.e., "mailboxes" or addresses") as appropriate. Further, the terms "old address" and/or "new address" are to be construed herein as including any changes in electronic messages including, but not limited to, changes in mailboxes/addresses, changes in other routing information, changes in demographic and/or other profile information, changes in personally identifiable information, and any other change information for which a correspondence between the "old" and the "new" information is desired. Further, a mailbox/address is also to be construed as including any location and or designation of a location at which a recipient may receive information in an electronic message. Such locations may include virtual locations (for example, a location on a server) and/or physical locations (for example, a location on a device identified by an address). Further, the use of "mailbox" is to be construed to include "address", and vice versa, as appropriate.

As discussed previously, the present invention provides a system and process that enables Sponsors subscribed to a Network Server to submit new Change Of Address (COA) records as well as receive new mailboxes/addresses for specific recipients. As such, the present invention enables both Sponsors and recipients to stay connected after the recipient has changed their e-mail or other electronic mailbox/address. In one embodiment, the Network Server utilizes a permission based system which only updates a new electronic messaging mailbox/address for a Sponsor designated by the recipient as being permitted to receive the new mailbox/address information. In another embodiment, the Network Server utilizes a streamlined approach, where upon receiving permission from a recipient, the Network Server notifies any and all requesting Sponsors of the change of address information.

Additionally, the Network Server may be configured to update changes in specific mailbox/address identifications and is not tied to updating all the mailboxes/addresses utilized by a specific recipient. Since a recipient may possess multiple mailboxes/addresses, this feature enables the recipient to specify which mailbox/address changes, if any, are to be made available to a specific Sponsor. For example, a recipient may designate an Internet news provider to receive an updated e-mail address but not an updated pager address. The present invention also provides various levels of selectivity to the recipient via the various embodiments of mailbox/address update and notification systems and processes specified hereinbelow.

Further, the system and process notifies Sponsors when a recipient's mailbox/address has changed and provides the location/address of the new mailbox. Further, since recipients often do not desire all sponsors or others to necessarily be informed of their new mailbox/address, the system allows a recipient to select which Sponsors are allowed to receive the new mailbox/address information. Similarly, since Sponsors generally consider their lists of recipients for electronic messaging to be trade secrets or otherwise worthy of protecting and Sponsors generally do not like to provide clearing houses, network message routing services, or others with such complete lists of their client base, in at least one embodiment, the system enables recipients to identify and notify Sponsors when their mailbox/address has changed without requiring a provider of such service to actually access a Sponsor's confidential or trade secret protected lists.

BRIEF DESCRIPTION OF THE DRAWING FIGURES

FIG. 13 is a screen shot of the Activity Log page provided in the first embodiment of the present invention.

FIG. 19C is a representative e-mail verification message sent to a recipient at a new address upon the recipient's registering of an old address and a new address with the Network Server associated with the web pages of FIGS. 19A and 19B for one embodiment of the present invention.

FIG. 19D is a screen shot of a third page, provided by the Internet site, to which the recipient is connected upon the verification by the recipient of the new address in the e-mail message of FIG. 19C and via which the recipient may select a privacy option for one embodiment of the present invention.

FIG. 19F is a representative e-mail verification message sent to a recipient at an old address upon the recipient's registering of an old address and a new address with the Network Server associated with the web pages of FIGS. 19A and 19B for one embodiment of the present invention.

Figure 20:
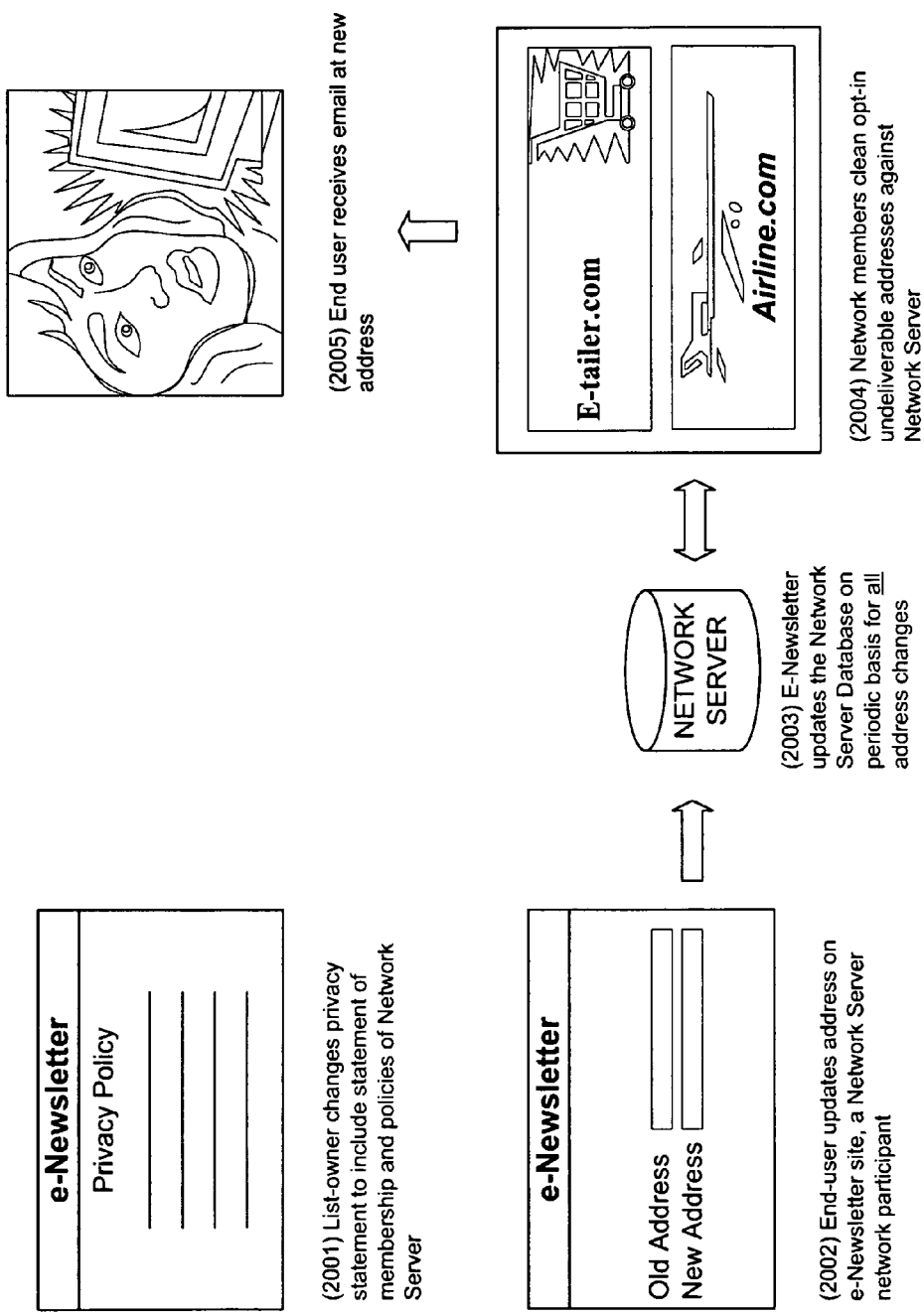
FIG. 20 is an illustrated flow diagram depicting a process by which a recipient registers an old address and a new address with a Sponsor who then utilizes the inputted information to update an Electronic Change of Address (ECOA) Network Server of the old and new addresses, for updating of other Sponsor's records for one embodiment of the present invention.
Figure 22:
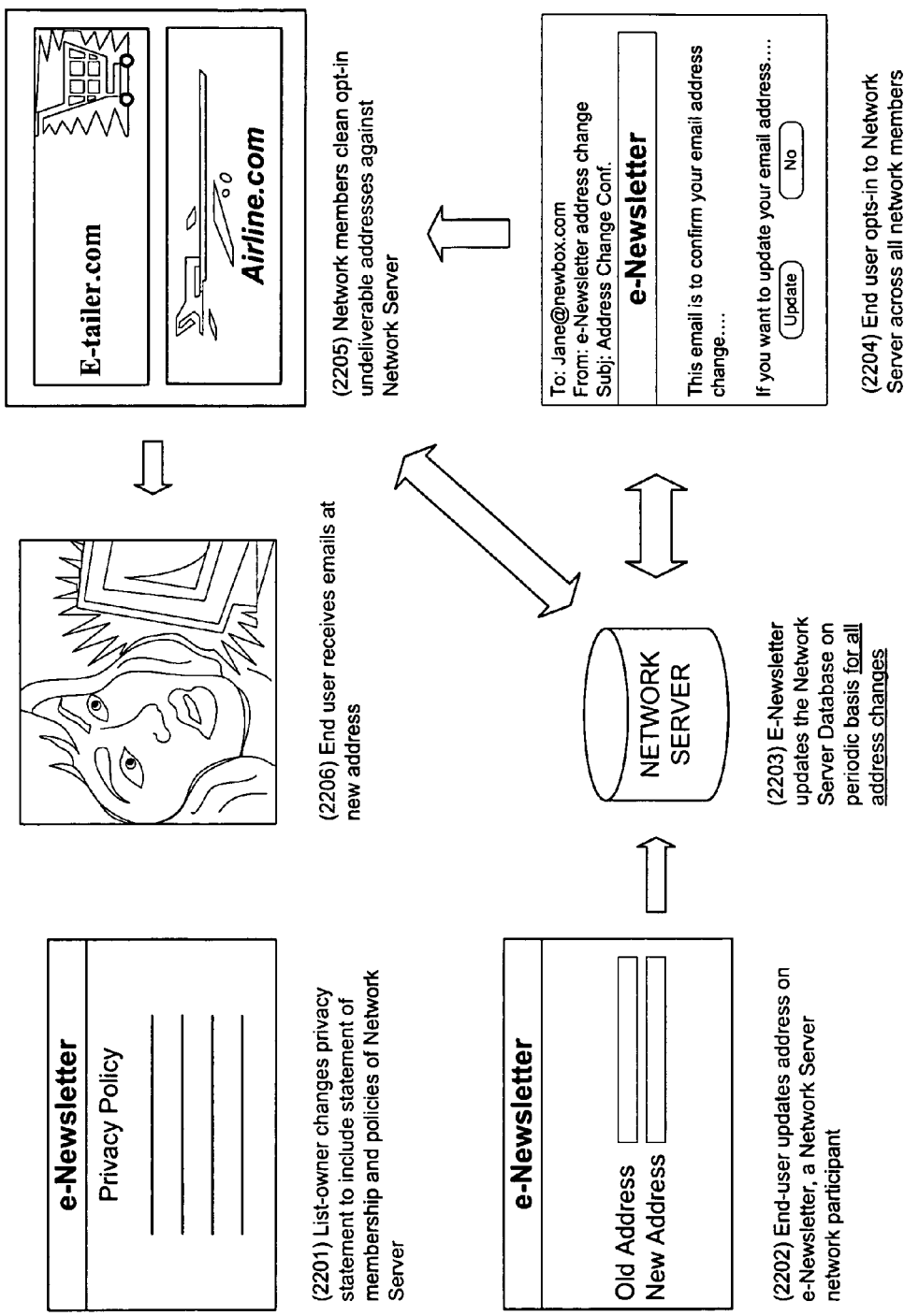

FIG. 22 is an illustrated flow diagram depicting a modification of the process shown in FIG. 20 whereupon specifying an old address and a new address on a Sponsor's web site, the recipient receives a message from the Network Server or the Sponsor and can then specify whether the address information is to be updated and shared by the Network Server with other Sponsors for another embodiment of the present invention.

Figure 23:
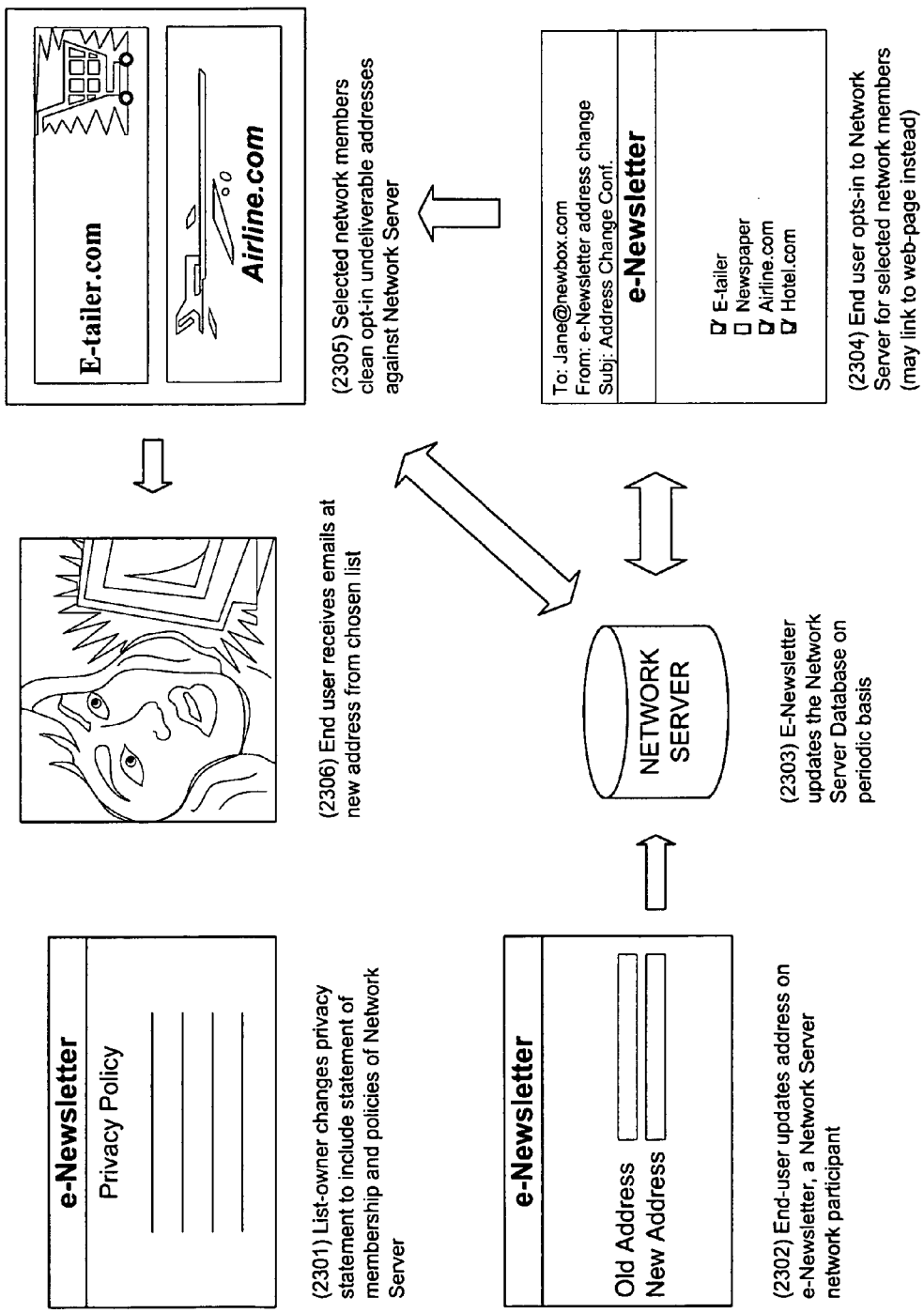

FIG. 23 is an illustrated flow diagram depicting a modification of the process shown in FIG. 22 wherein addition to specifying whether the address information is to be updated, the recipient also specifies with which Sponsors the information is to be shared by the Network Server for another embodiment of the present invention.

Figure 24:
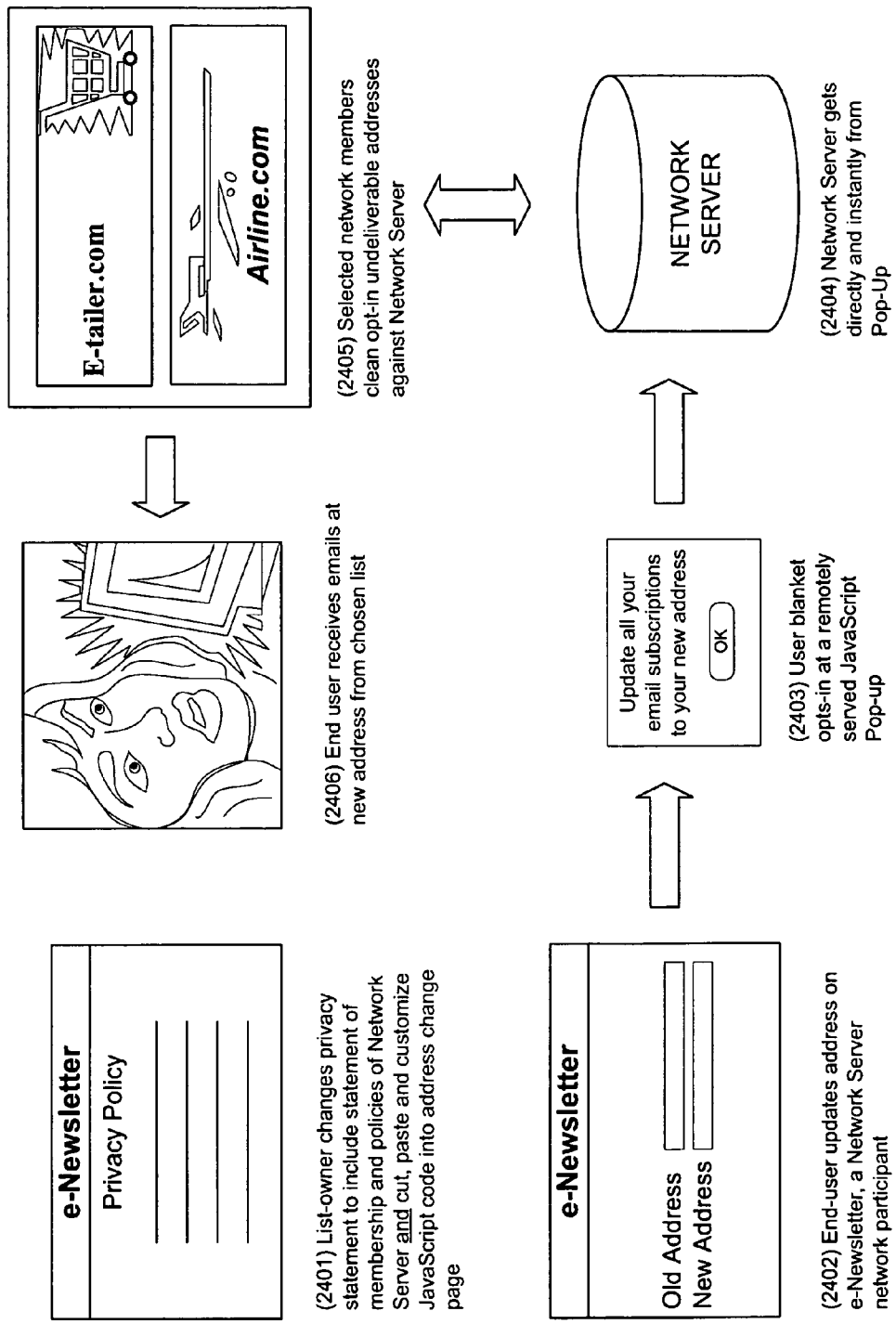

FIG. 24 is an illustrated flow diagram depicting a process whereupon entry of an old address and a new address at a Sponsor's web site, the recipient is presented with a pop-up window, linked directly to the Network Server, via which the recipient can elect to have or not have the address information updated on the Network Server and/or with other Sponsors for another embodiment of the present invention.

Figure 25:
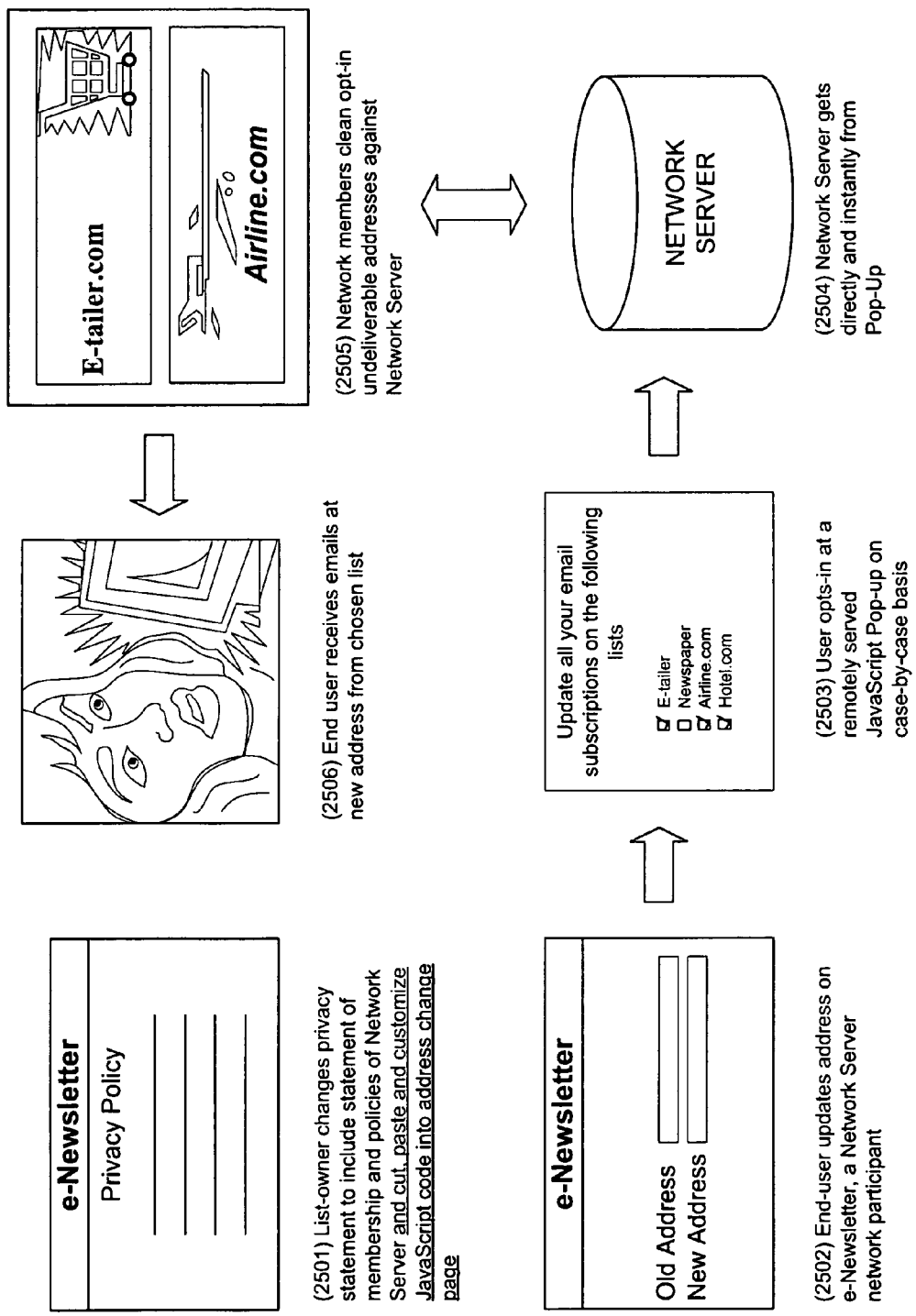

FIG. 25 is an illustrated flow diagram depicting a modification of the process shown in FIG. 24 wherein the recipient is presented with a pop-up window containing a listing of Sponsors which the recipient can designate for receiving the address information from the Network Server for another embodiment of the present invention.

Figure 26:
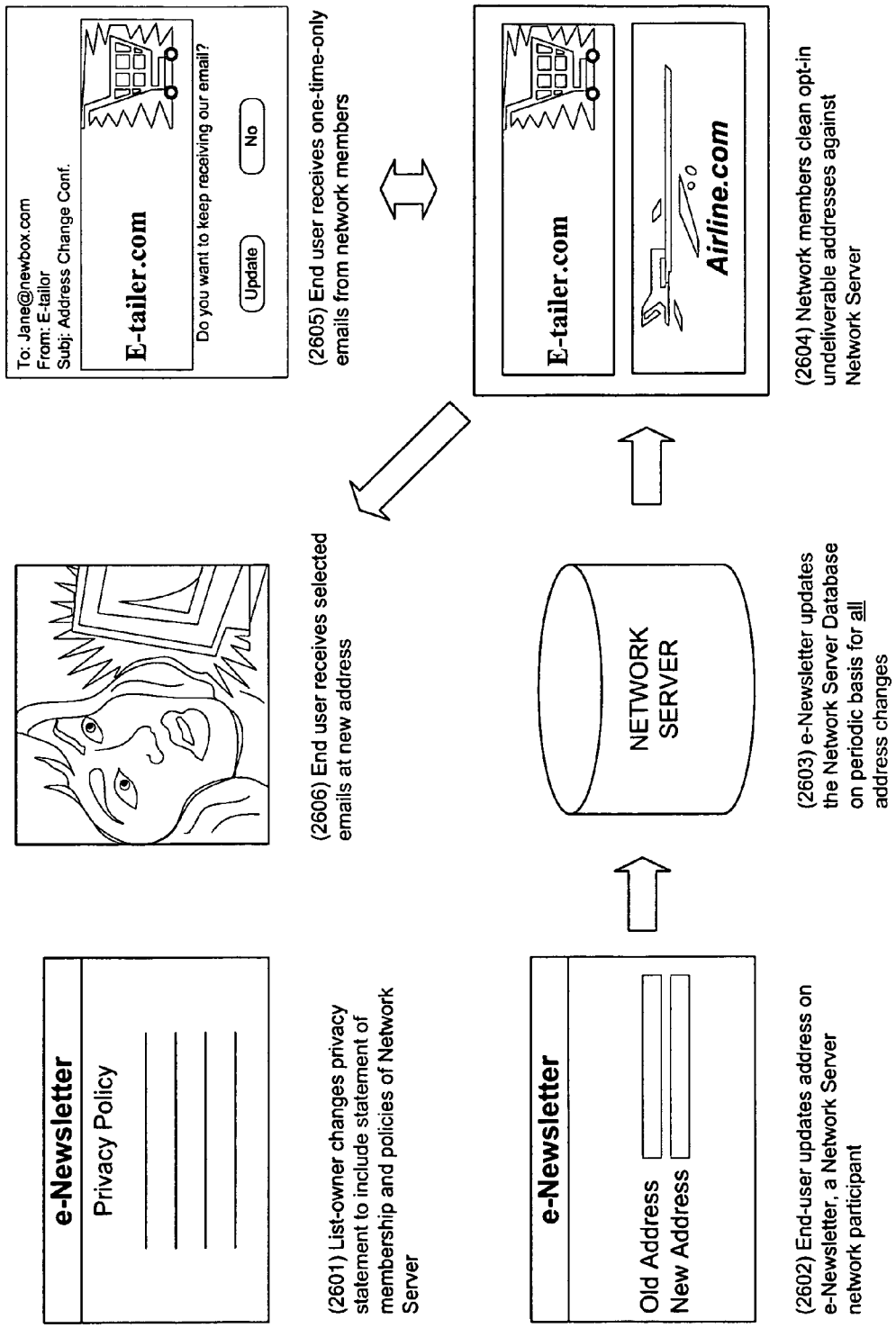

FIG. 26 is an illustrated flow diagram depicting a modification of the process shown in FIG. 20, whereupon receiving the address information from the Network Server, each Sponsor sends a message to the recipient requesting permission to update the old address with the new address.

Figure 27A:
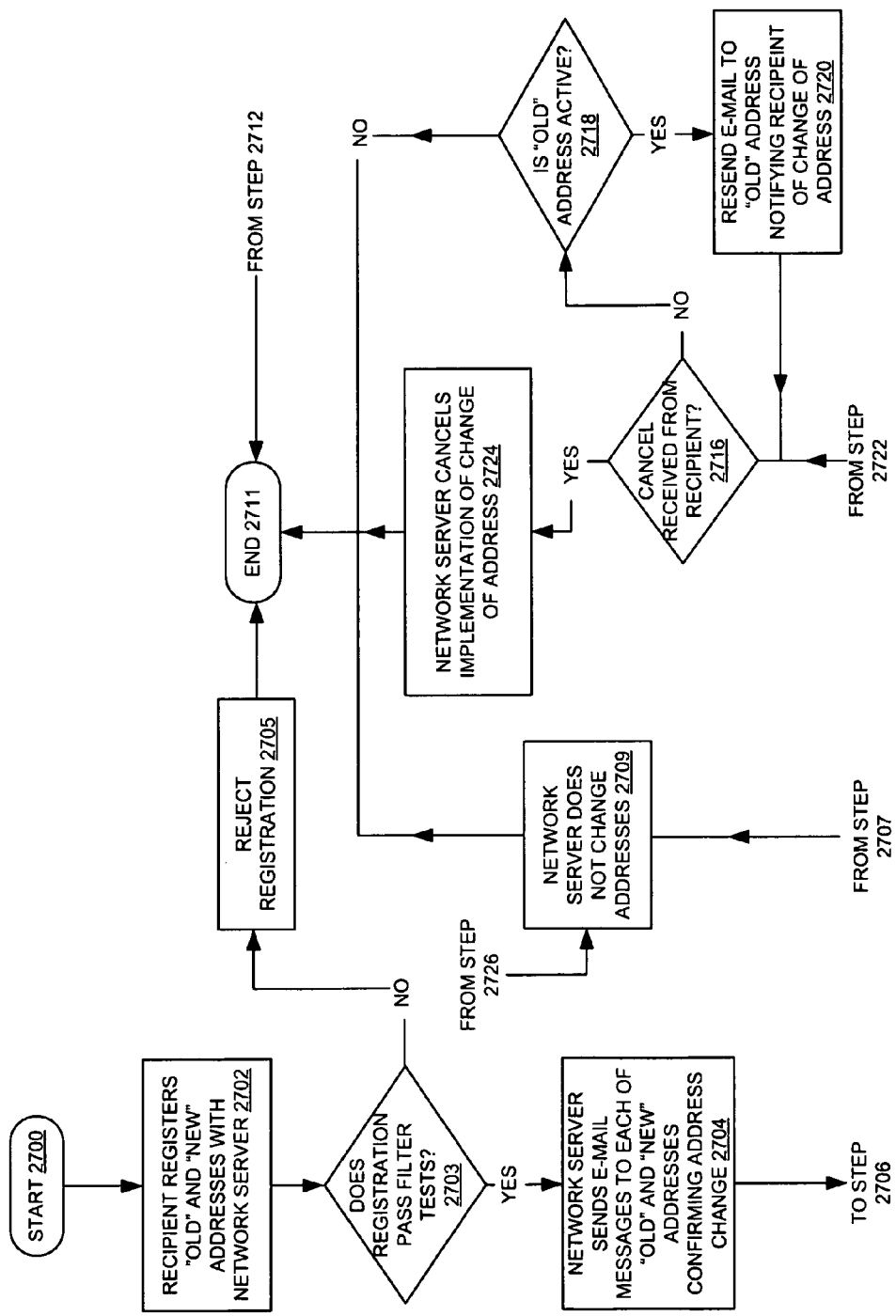
Figure 27B:
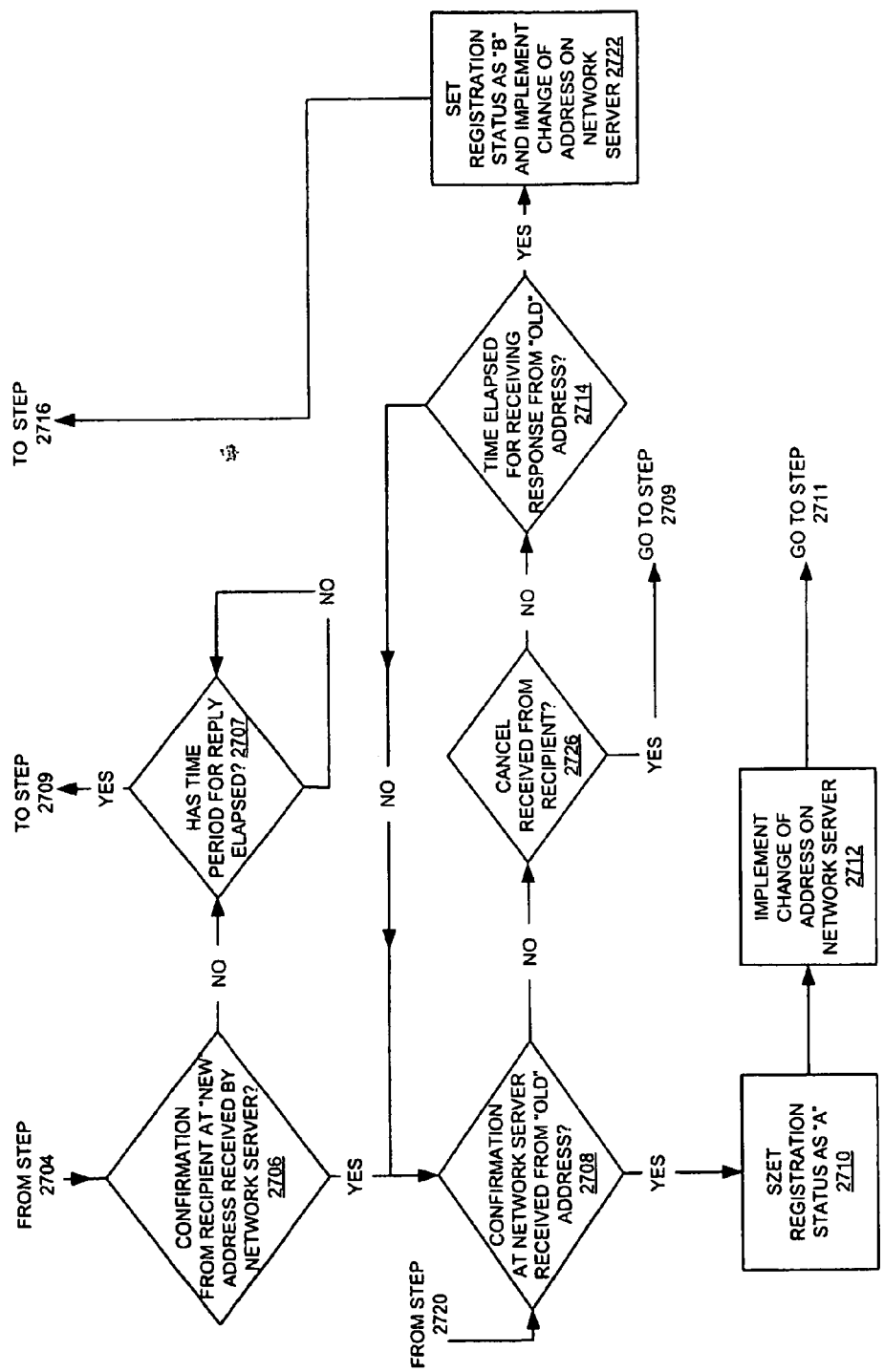

FIGS. 27A and 27B are flow diagrams illustrating a process for validating a change of address request for one embodiment of the present invention.

DETAILED DESCRIPTION OF THE INVENTION

Figure 1:
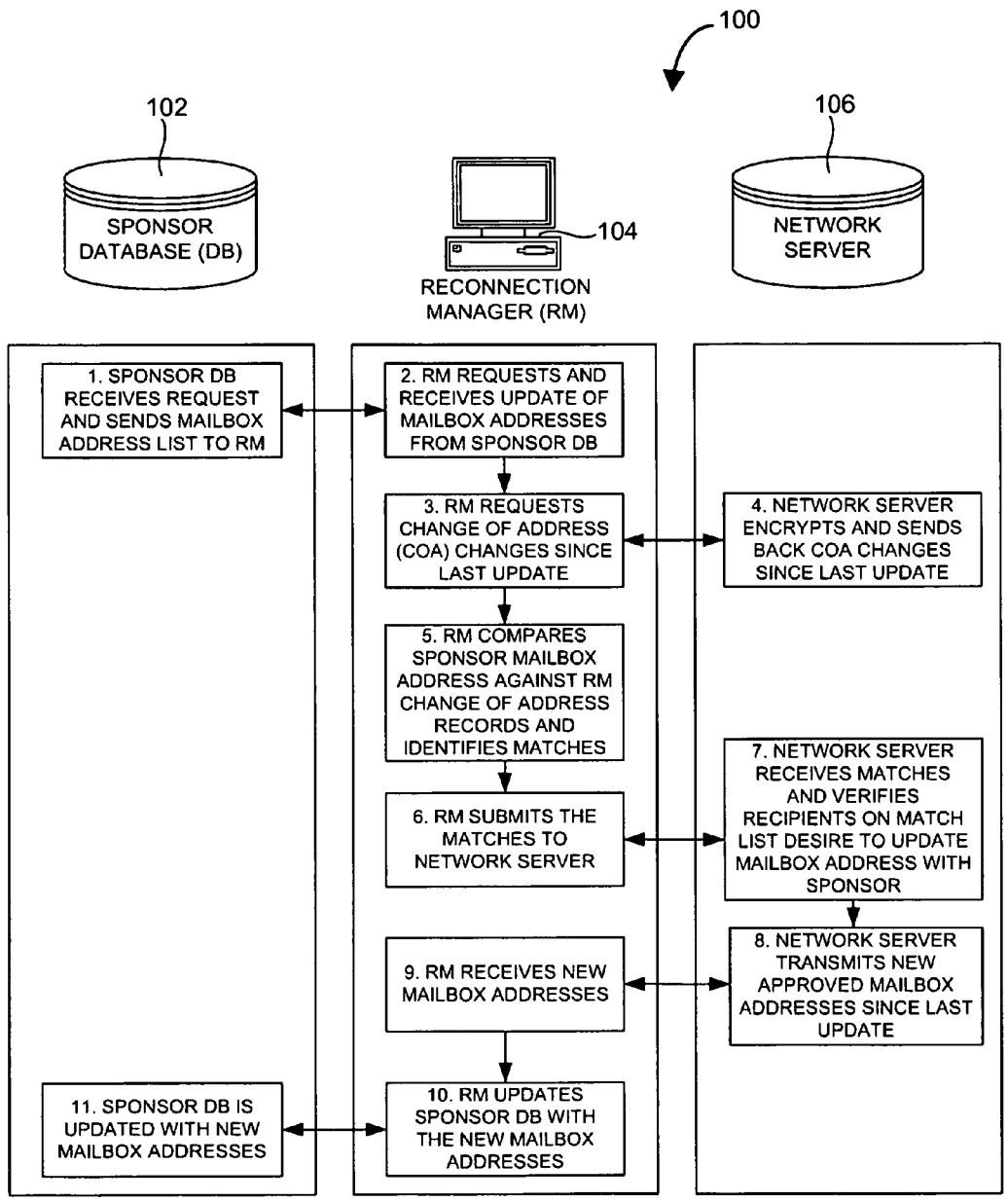
FIG. 1 is a schematic representation of the system and process by which a Sponsor is provided with updated e-mail addresses for a first embodiment of the present invention.

As shown in FIG. 1, the first embodiment of the present invention provides a system 100 and process for automatically updating listings of electronic mailboxes/addresses associated with specific recipients for a Sponsor owning/accessing such listings. As shown, the system interfaces with a Database (DB) 102 associated with a Sponsor (hereinafter, the "Sponsor DB") (the Sponsor may own or merely access the Sponsor DB, as is well known in the art). The Sponsor DB 102 suitably contains listings of electronic mailboxes/addresses that are associated with the various recipients of messages and/or information from the Sponsor. For purposes of the present description, such messages and/or information are assumed to be communicated electronically in the format of an e-mail. It is, however, to be appreciated that the present invention may be utilized in conjunction with any form of electronic messages and/or information.

The system 100 also utilizes a Network Server 106 (or a clearing house) that provides a centralized location at which changes of addresses ("COA") for recipients are provided. Additionally, as mentioned previously, the Network Server 106 also provides recipients with the option of designating to which Sponsors a COA is to be communicated. As such, the Network Server 106 facilitates the permissive notification features of the system 100.

The system 100 also includes a Re-Connection Manager (RM) 104 which is utilized by the Sponsor DB 102 to identify those recipients on the Sponsor's lists for whom the Network Server has updated COA information. In the first embodiment, the RM 104 is provided in a software application utilized by the Sponsor DB 102. However, it is to be appreciated, that the RM 104 may also be provided in a hardware device or other devices and/or software applications. Further, in the first embodiment, the RM 104 is provided to Sponsors and controlled by Sponsors such that access to a Sponsor's list of recipients is not needed by the Network Server 106 in order to identify those recipients for whom COA information is needed.

The system 100 provides the following functions including, but not limited to:

updating address lists from the Sponsor DB 102 to the RM 104 and optionally onto the Network Server 106;

updating new COA information from the Sponsor DB 102 to the Network Server 106;

updating the new e-mail addresses from the Network Server 106 to the Sponsor DB 102;

updating unsubscribes from the Network Server 106 to the Sponsor DB 102;

updating holds for specific subscriptions from the Network Server 106 to the Sponsor DB 102; and updating new subscriptions from the Network Server 106 to the Sponsor DB 102.

As mentioned previously, the system 100 also utilizes the RM 104 to perform routine checks of e-mail address lists against new "active" COA data at the Network Server 106. The RM 104 communicates with the Network Server 106 in order to request and receive new e-mail addresses and other information relating to e-mail subscriptions. The RM 104 may also be configured to retrieve any new COA records from the Sponsor DB 102 and update the Network Server 106 with such information.

Additionally, the data communicated between the Sponsor DB 102 and the Network Server 106 may be encrypted. By utilizing encryption techniques well known in the art, Sponsors and recipients are ensured that such COA information, trade secret protected recipient lists, and other information are suitably protected. The present invention may utilize any form of encryption and/or data security features including, but not limited to, digital certificates, secure-socket layers, firewalls, encryption keys, passwords and sign-on names, and other security features, and is not to be construed as being limited to any specific security systems and/or methodologies. In the first embodiment, both the Network Server 106 and the RM 104 are provided a key in order to encrypt and un-encrypt data. Additionally, in order to expedite system processing of COA information, the RM 104 un-encrypts the new e-mail addresses from the Network Server 106.

When configured as a software application, the RM 104 is loaded onto a PC running MICROSOFT WINDOWS 2000® or NT® at the Sponsor site or on any other system or network configuration capable of hosting and/or accessing the features and functions provided by the RM 104. It is to be appreciated that various devices and/or system configurations may be utilized to provide the RM 104 features/functions to a Sponsor. Additionally, an initial installation and setup of the RM 104 and access to the Sponsor DB 102 and the Network System 106 may be needed in order to properly read/write to the correct tables located in the Sponsor DB 102 when performing an update of the Sponsor DB 102 to the RM 104 and/or an update of new e-mail addresses from the RM 104 to the Sponsor's DB 102 (for example, when performing address updates, new subscription additions, holds, and unsubscribes). The RM 104 may require a user (for example, an employee of the Sponsor) to enter a username/password in order to validate that the requests are coming from an authorized representative of the Sponsor.

In the first embodiment, the RM 104 also performs an initial Refresh function. FIG. 1 illustrates one process by which this function may be implemented. As shown, the process begins when a user of the RM 104 requests an updating of e-mail address listings from the Sponsor DB 102 (Step 1). At this point, the process communicates the address list to the RM 104 which is then suitably updated with the Sponsor's e-mail address list (Step 2). Upon receiving the request, the RM 104 requests the updated e-mail address list from the Network Server 106 (Step 3). The Network Server encrypts and sends back to the RM 104 COA changes since the last update request from the RM 104 (Step 4). The e-mail addresses received from the Network Server 106 are then matched to old e-mail addresses provided by the Sponsor DB 102 to the RM 104 (Step 5). The RM 104 also, preferably, is capable of reading e-mail addresses directly from the Sponsor's DB 102 in order to perform a match if desired. Once these matches have been made, the RM 104 suitably communicates those listings identified by the matching process to the Network Server 106 (Step 6). The Network Server 106 receives the request from the RM 104 for the new addresses for the identified recipients and verifies with the recipient, as necessary, that the Sponsor may receive the new e-mail address. While the first embodiment requires the recipient's permission before an e-mail address may be updated, it is to be appreciated that the system, for this embodiment and/or for other embodiments, including, but not limited to, those specifically described herein, may be configured such that such permission may be implicitly granted (i.e., by signing onto the system, permission is implicitly granted), explicitly granted (the recipient has agreed that updated e-mail listings may be provided to any Sponsor), or may not be required at all (for example, in a system where the recipient's new address is public knowledge, freely obtainable by anyone willing to search and find it).

When permission is received from the recipient, the Network Server 106 communicates the recipients' new e-mail address to the RM 104 (Step 8). As may be appreciated by those skilled in the art, such communications may occur during the initial session or during a subsequent session with the RM 104. At this point, the RM 104 receives the new e-mail addresses (Step 9). The RM 104 executes an update function which inputs the new e-mail addresses into the Sponsor DB 102 (Step 10). The newly saved records (new e-mail addresses) are utilized to reconnect the Sponsors DB 102 with their recipients (Step 11). In the first embodiment, this process is performed automatically, however, any of the above mentioned process steps may be configured to be performed automatically or manually, as desired by the Sponsor. Additionally, a process step configured to be performed automatically may also be set to run on periodic intervals or any other intervals, as specified by the Sponsor.

Figure 2:
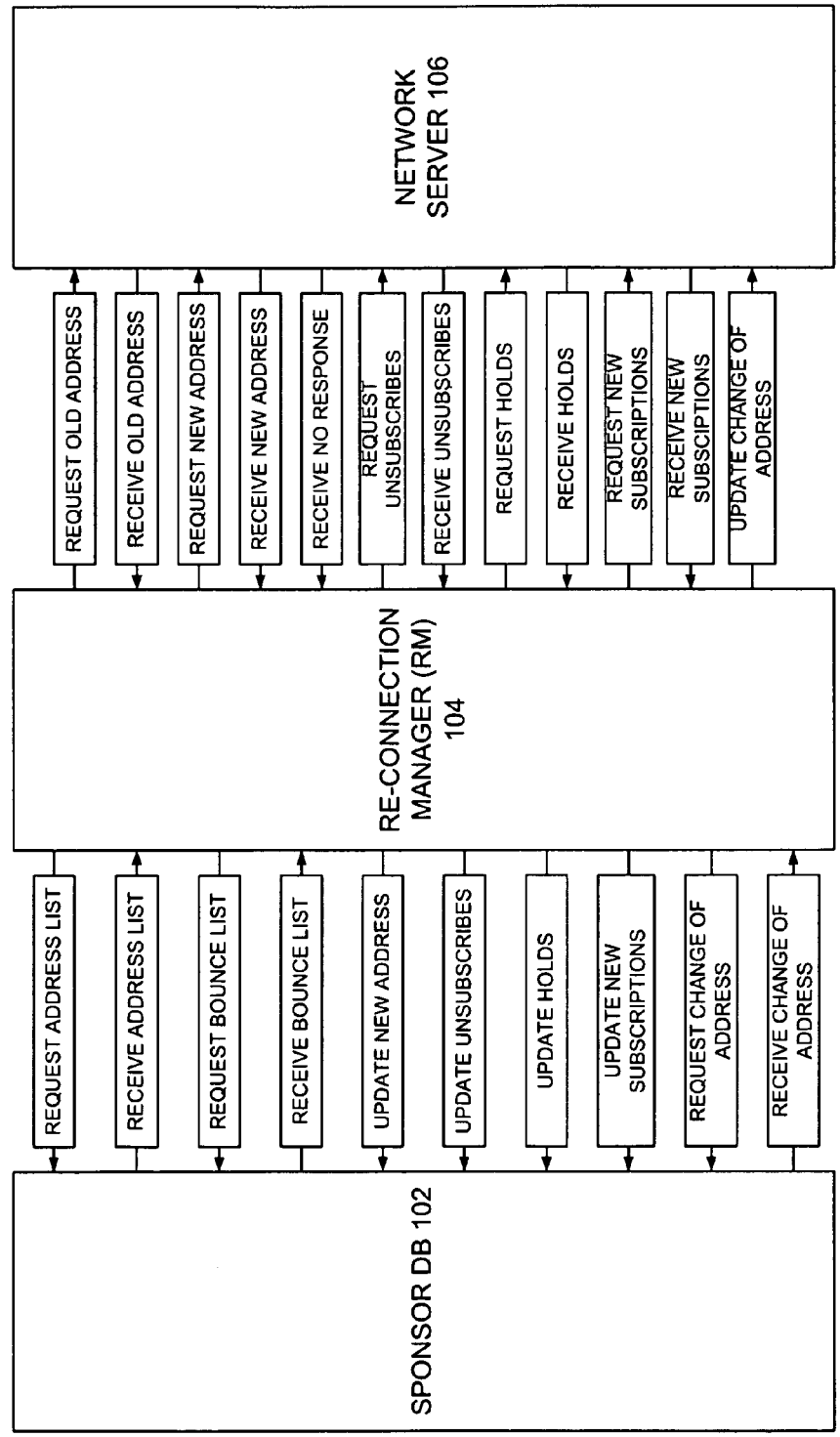
FIG. 2 is a schematic representation of the various data exchanges and processes which occur between a Sponsor, the Re-Connection Manager (RM), and a Network Server for the first embodiment of the present invention.

Referring now to FIG. 2, the key data flows utilized by the first embodiment are as follows:

Address List—the list of e-mail addresses (broken down by list owner/Sponsor) sent to the RM 104 from the Sponsor DB 102. The RM 104 matches these e-mail addresses with old e-mail addresses obtained from the Network Server 106. This data includes a time stamp so that updates will only have to receive data that has changed or is new since the last request. This data may be updated to the RM 104 on a batch or real-time basis, or individually as desired.

Bounce List—the list of undeliverable e-mail addresses sent to the RM 104 from the Sponsor DB 102. The RM 104 matches these e-mail addresses with the old e-mail addresses obtained from the Network Server 106. This data includes a time stamp so that updates to the RM 104 from the Network Server only include the new data (i.e., e-mail address changes) since the last request. This data may be updated to the RM 104 on a batch or on a real-time basis.

Old Address—the old e-mail address sent as a part of the change of address record is sent from the Network Server 106 to the RM 104. The old e-mail address is matched against the address list and/or the bounce list. If a match is made, the e-mail address is sent to the Network Server 106 for requesting the new e-mail address of a recipient. This data is time stamped so that updates will only have to contain data since the last time the process was performed. This data may be updated to the RM 104 on a batch or real-time basis.

New Address—the new e-mail address is a part of the change of address record. Once a match is made with an old e-mail address, a request is sent by the RM 104 to obtain the new e-mail address from the Network Server 106. If the user gives their permission, the new e-mail address is sent to the RM 104 and updated in the Sponsor's DB 102. If the user responds with a "NO", this is also communicated back to the Sponsor DB 102. This data is time stamped and may occur on a batch or real-time basis.

Unsubscribes—the request from a user to discontinue receiving an e-mail subscription at a specific e-mail address. The RM 104 will request and receive unsubscribes from the Network Server 106. The unsubscribes are received by the RM 104 and updated in the Sponsors DB 102. A notification may also be sent to the Sponsor informing them to stop sending e-mails to the disinterested recipient. This data may be time stamped and may occur on a batch or real-time basis.

Holds—the request from a recipient to hold an e-mail subscription at a specific e-mail address for a certain period of time. The RM 104 may request and receive holds from the Network Server 106 and record updates in the Sponsors DB 102. Such updates are communicated to the Sponsor and stop the e-mails from being sent to the recipient for a specified time period. This data may also be time stamped and may occur on a batch or real-time basis.

New Subscriptions—the request from a user to subscribe to a new e-mail subscription at a specific e-mail address. The RM 104 may request and receive new subscriptions from the Network Server 106. Upon receipt of the new subscriptions, the RM 104 updates the Sponsors DB 102. These new subscriptions and updates may be time stamped and may occur on a batch or real-time basis.

Change of Address (COA)—the record that contains both the old and new e-mail address. The Sponsor DB 102 may collect this information with the permission of the recipient. The RM 104 may request and receive this information from the Sponsors DB 102 and submit the change of address information to the Network Server 106. This information may be time stamped and may occur on a batch or real-time basis.

Further, Table 1, below, illustrates data parameters commonly utilized for the first embodiment of the present invention in order to implement the features and functions identified herein. It is to be appreciated that the data parameters may vary based upon the information requested and communicated, and the particular system and database configurations utilized. As such, those parameters specified in Table 1 are illustrations of one set of parameters utilized in the first embodiment. Other and/or additional parameters may be utilized in other embodiments.

TABLE 1

Data Parameters

| # | Category | Name | Type |
|---|---|---|---|
| 1 | Address List | E-mail Address | Text |
| 2 | Address List | Partner ID | Num |
| 3 | Address List | List Owner ID | Num |
| 4 | Address List | List ID | Num |
| 5 | Address List | Update Date | Date |
| 6 | Bounce List | E-mail Address | Text |
| 7 | Bounce List | Partner ID | Num |
| 8 | Bounce List | List Owner ID | Num |
| 9 | Bounce List | List ID | Num |
| 10 | Bounce List | Update Date | Date |
| 11 | Old Addresses | Old Email | Text |
| 12 | Old Addresses | Update Date | Date |
| 13 | New Address Request | Matched email | Text |
| 14 | New Address Request | Partner ID | Num |
| 15 | New Address Request | List Owner ID | Num |
| 16 | New Address Request | List ID | Num |
| 17 | New Address Request | Request Date | Date |
| 18 | New Address Update | Old Email | Text |
| 19 | New Address Update | New Email | Text |
| 20 | New Address Update | Partner ID | Num |
| 21 | New Address Update | List Owner ID | Num |
| 22 | New Address Update | List ID | Num |
| 23 | New Address Update | Update Date | Date |
| 24 | Unsubscribes | E-mail | Text |
| 25 | Unsubscribes | Partner ID | Num |
| 26 | Unsubscribes | List Owner ID | Num |
| 27 | Unsubscribes | List ID | Num |
| 28 | Unsubscribes | Update Date | Date |
| 29 | Holds | E-mail | Text |
| 30 | Holds | Partner ID | Num |
| 31 | Holds | List Owner ID | Num |
| 32 | Holds | List ID | Num |
| 33 | Holds | Update Date | Date |
| 34 | New Subscriptions | E-mail | Text |
| 35 | New Subscriptions | Partner ID | Num |
| 36 | New Subscriptions | List Owner ID | Num |
| 37 | New Subscriptions | List ID | Num |
| 38 | New Subscriptions | Update Date | Date |
| 39 | Change of Address | Old Email | Text |
| 40 | Change of Address | New Email | Text |
| 41 | Change of Address | Partner ID | Num |
| 42 | Change of Address | List Owner ID | Num |
| 43 | Change of Address | List ID | Num |
| 44 | Change of Address | Update Date | Date |

Similarly, Table 2 illustrates functional requirements commonly desired and/or provided with the first embodiment of the present invention. As shown, such functional requirements may include, but are not limited to, installation specifications, security features, system features, and other information. It is to be appreciated that various other embodiments of the present invention may be utilized which may include some, all or even none of these functional requirements.

TABLE 2

Functional Requirements for System

| # | Category | Description |
|---|---|---|
| 1 | Installation | Must be easy to install and setup. The RM may utilize application specific software to be compatible with the various databases utilized by Sponsors. |
| 2 | Help Functions | Contains a help function for the user to search on specific topics. Also provides a help function which defaults to common questions the user may have based on the current function being provided by the system and includes links to on-line help. |
| 3 | Application Platform | Preferably compatible with MICROSOFT WINDOWS 2000 ® and/or WINDOWS NT ® personal computer based systems, MACINTOSH ® systems, DEC ® systems, HP ® systems, and any other workstations commonly known and/or used in the art. |
| 4 | Request Features | System capable of requesting new changes for Change Of Address (COA) records since last update. Requests are preferably sent on a daily or weekly basis. Data received in response to request includes: old address (changed or updated since last connection of RM to Network Server); and date updated. |
| 5 | Security Features | Data transfers are communicated between Sponsor DB, RM, and Network Server with the appropriate levels of security including encryption, secure socket layers, password/sign-on identification, and various other security techniques which are well know in the art. |
| 6 | Processing & Filtering Data | RM preferably provides the capabilities of matching and filtering out those new COA records received from the Network Server against those mailbox addresses identified in the Sponsor's DB lists. |
| 7 | Processing & Filtering Data | Ability for the RM to send matches (identified in block 6 processing) to Network Server as requests for new mailbox addresses. Request may contain: mailbox address matches; Sponsor identifier; list owner identifier; and list identifier. Request may be sent on a daily or weekly basis. |
| 8 | Network Server | System includes ability to request new changes to COA records since last update. The data provided in the response by the Network Server to the request may be sent on a daily basis and contains: old mailbox address; new mailbox address; Sponsor identifier; list owner identifier; list identifier; and time and date changed (to provide synchronization |

TABLE 2-continued

Functional Requirements for System

| # | Category | Description |
|---|---|---|
| | | between the various system devices (i.e., the Sponsor DB, RM, and the Network Server). |
| 9 | Sponsor DB Features | Ability for the system to update the Sponsor DB with then new mailbox addresses, which are used to reconnect the Sponsor with their recipients. |
| 10 | System Features | Ability for the system to time stamp every transaction. |
| 11 | System Logging | System keeps an activity log for the Sponsor to view. |
| 12 | Automated Capabilities | System may be configured to automatically update mailbox addresses on a periodic basis. |
| 13 | On-Line Information Access | Sponsor may utilize a hyper-link to visit the Network Server site and view both data reports and performance reports. |
| 14 | Reporting Features | System is capable of showing the Sponsor local RM reports that indicate which addresses matched and what data was saved. |
| 15 | Feedback | Confirmation message for each action performed by the Sponsor. |
| 16 | Custom Tailored Searches | Utilizing a SQL Query or similar tool, Sponsor can select for which list owners and lists they desire to perform matches and saves. |
| 17 | New Subscriptions | System may be configured to update the Sponsors DB with requests for new subscriptions. |
| 18 | Held Subscriptions | System may be configured to update the Sponsors DB with requests for holding subscriptions. |
| 19 | Automated Features | System may be configured to update COA records from Sponsors DB to Network Server on a daily basis. |
| 20 | Unsubscribe Request Processing | System may be configured to update the Sponsors DB with requests for unsubscribing to subscriptions. |
| 21 | Exporting Data | System may export the new mailbox addresses to a flat file. |

While the first embodiment of the present invention utilizes the above data flows to provide the features and functions identified previously herein, it is to be appreciated that various other data flows, systems, and processes may be utilized. Further, while the first embodiment of a system implementing the present invention is described in the context of a software application utilized in conjunction with a network based server, such as one hosted on an Internet site, the system may also be hosted on stand-alone systems, non-Internet based systems, private networks, public networks and similar systems.

Figure 3:
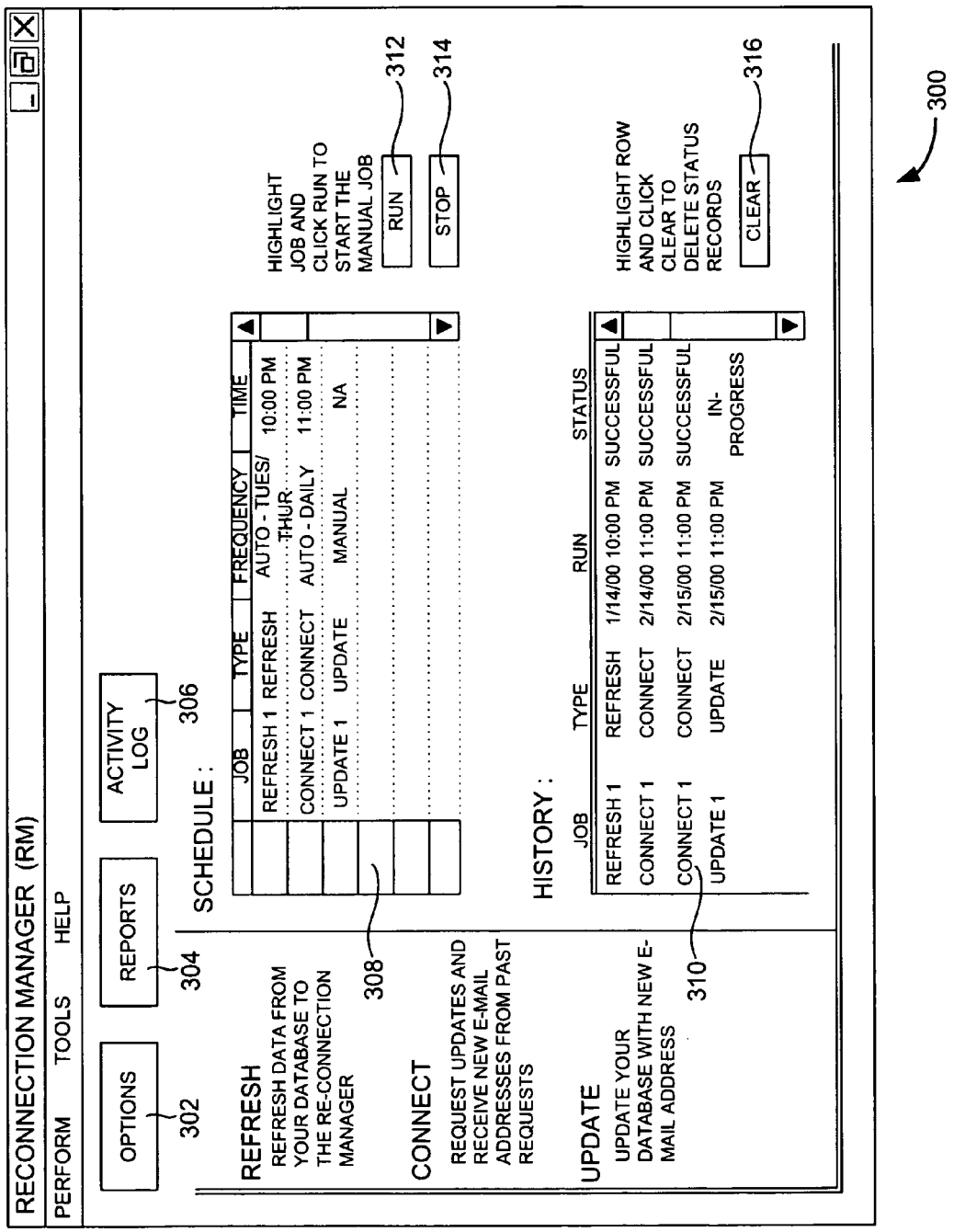
FIG. 3 is a screen shot of the Re-Connection Manager home page provided in the first embodiment of the present invention.

Further, the system 100 utilizes a RM 104 to facilitate the identification and requesting of new e-mail addresses for a Sponsor. FIGS. 3–15 provide an illustration of a series of screen shots utilized in conjunction with one software application which provides the before mentioned functions and features. As shown in FIG. 3, the software application includes a RM home page 300. This page 300 includes various buttons such as an Options button 302, a Reports button 304, and an Activity Log 306. Additionally, this page 300 includes a field 308 showing sessions which are scheduled. By suitably highlighting or selecting an entry in this field 308, a Sponsor may designate a job to Run 312 or Stop 314 as desired. Additionally, this page 300 includes a field 310 in which a history of previously run jobs may be displayed. Entries from this field 310 may be deleted by selecting the Clear button 316.

Figure 4:
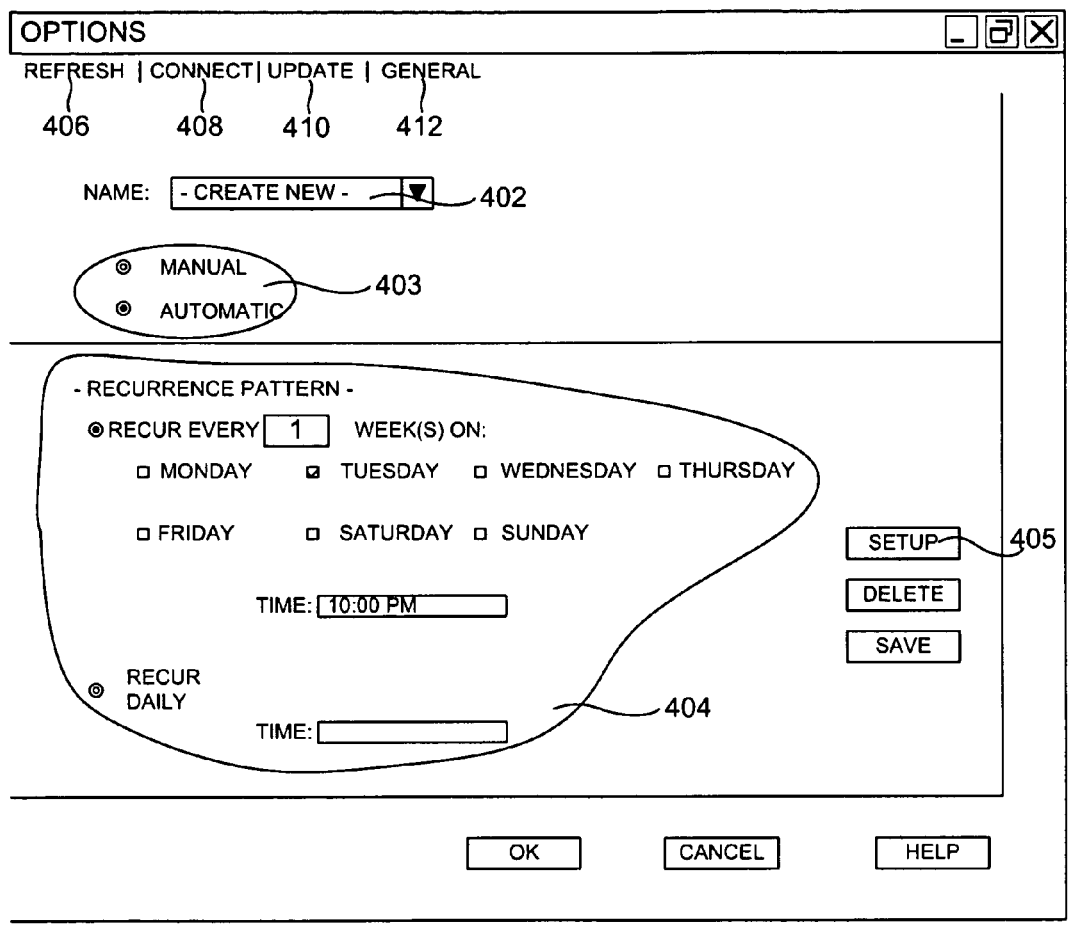
FIG. 4 is a screen shot of the Refresh Options page provided in the first embodiment of the present invention.

When the Options button 302 is selected, the software displays the Refresh Options page 400, as shown in FIG. 4. As mentioned previously, the system utilizes the refresh function to update listings of e-mail addresses in the RM 104 with information provided by the Sponsor DB 102. The Refresh Options page 400 provides the data entry fields necessary to update the RM 104 with information provided by the Sponsor DB 102. As shown, this page allows a Sponsor to create multiple refresh options by individually naming and saving each option via the field 402. Additionally, the check button 403 allows the Sponsor to configure the option to occur automatically or upon manual input. Further, the recurrence of each option may also be individually programmed via the fields and buttons shown in the recurrence section 404. For example, the refresh option may be configured to be updated at a time and frequency compatible with the Sponsor's needs.

Figure 5:
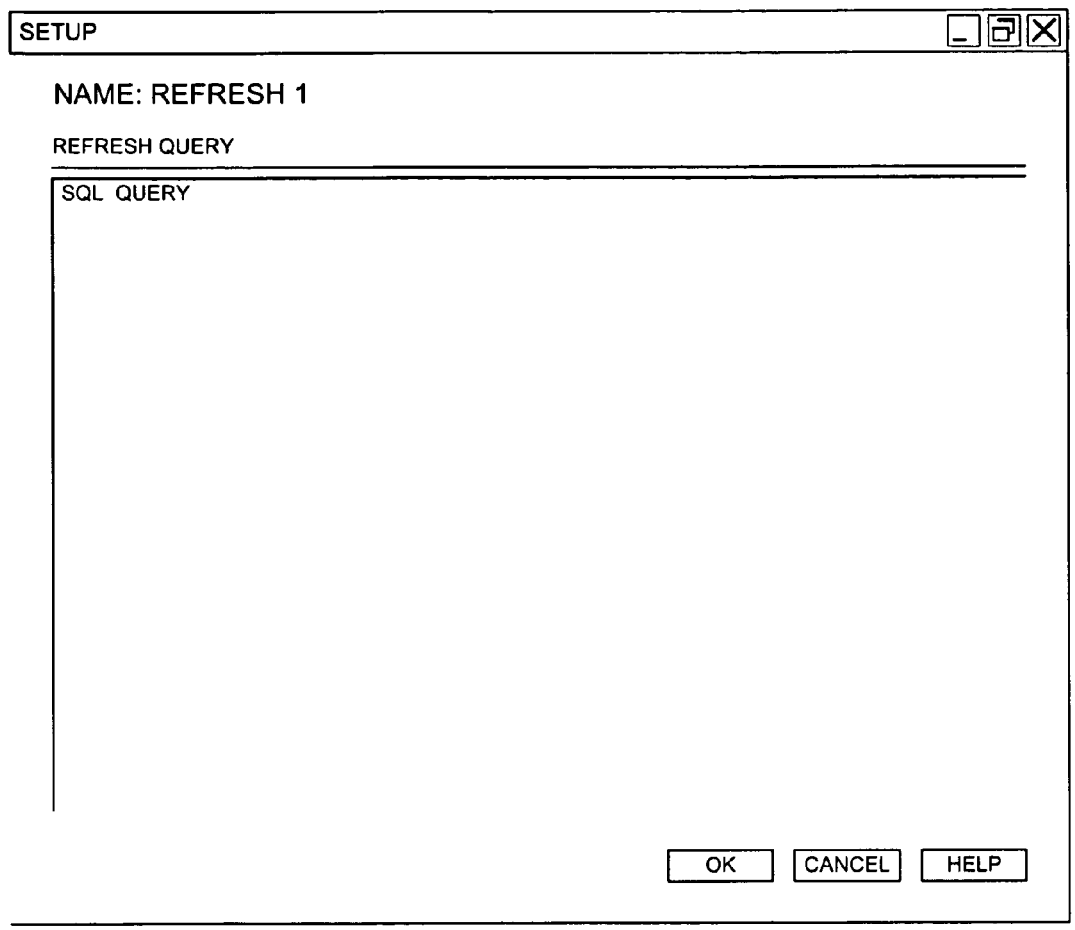
FIG. 5 is a screen shot of the Setup Refresh page provided in the first embodiment of the present invention.

When the Sponsor selects the Setup button 405, the software displays the Refresh Setup page 500, as shown in FIG. 5. The software may be configured such that a Sponsor may enter a SQL query which instructs the RM 104 to access and obtain the needed information from the Sponsor DB 102. SQL queries are well known in the art, as such, those skilled therein appreciate that the SQL query may vary from application to application depending upon, for example, the data structures utilized in the database, the database architecture, system configurations, communications protocols and other variables. Further, it is to be appreciated that access to and from information in a database may be accomplished utilizing various other protocols, queries, processes and languages. Therefore, the present invention is not to be construed as being limited to using SQL queries and may utilize, for example, XML queries to interface with the Sponsor DB 102.

Figure 6:
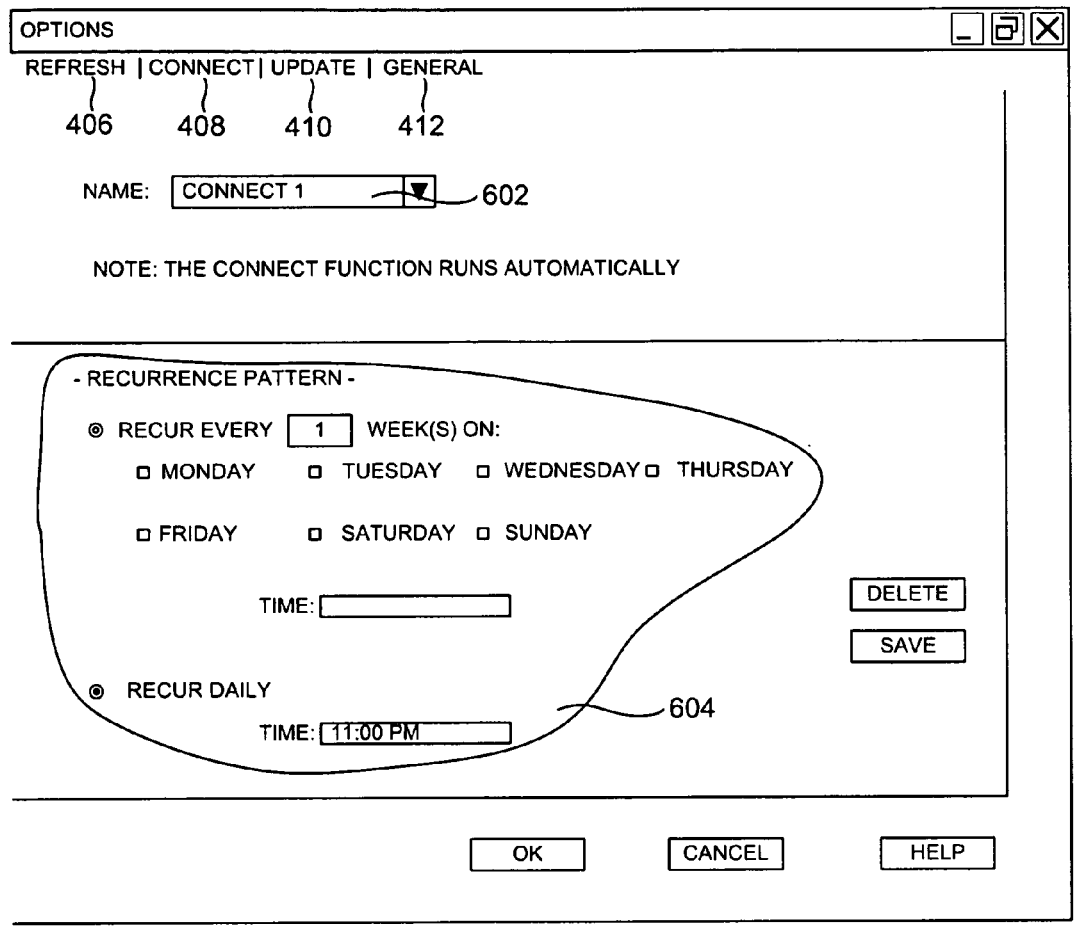
FIG. 6 is a screen shot of the Connect Options page provided in the first embodiment of the present invention.

Referring again to FIG. 4, when the Sponsor selects the Connect tab 408 the software displays the Connect Options page 600, as shown in FIG. 6. As provided for the Refresh page 400 (see FIG. 4), the Connect Options page 600 provides a field 602 in which the Sponsor may name numerous connect options. As mentioned previously, the connect option is the software module which controls the connection between the RM 104 and the Network Server 106 and the transmission therebetween of updated e-mail addresses which have changed since a previous connection. As shown, this option is designed such that it occurs automatically. However, the software is also designed such that the Sponsor may define the recurrence pattern 604 for each connect option.

Figure 7:
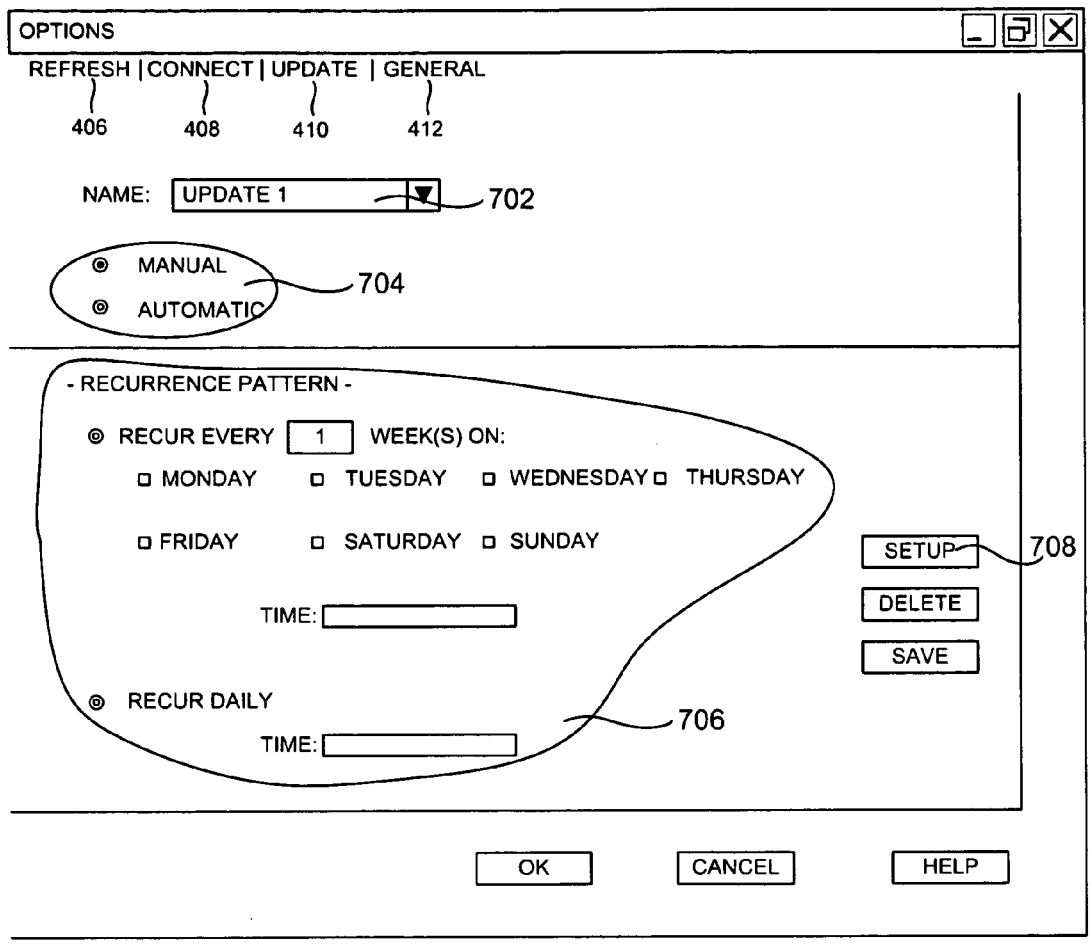
FIG. 7 is a screen shot of the Update Options page provided in the first embodiment of the present invention.
Figure 8:
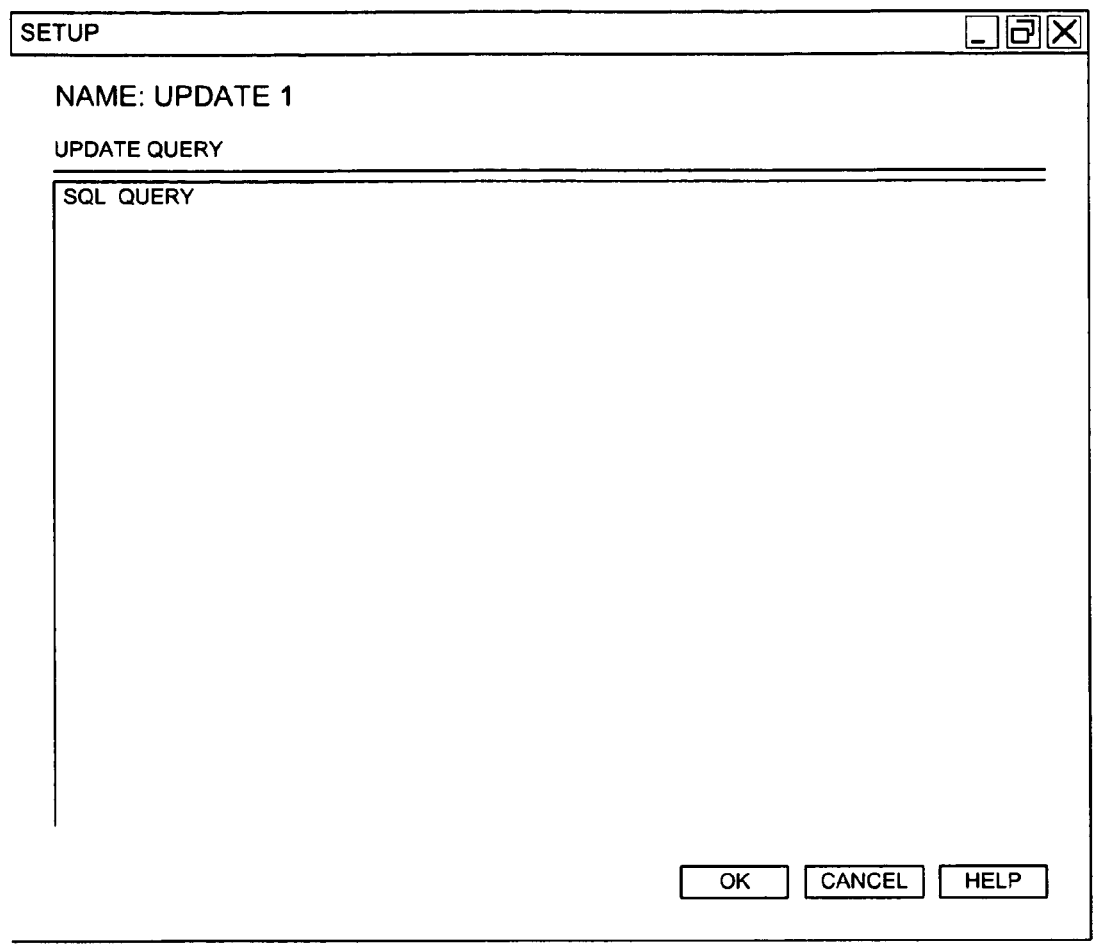
FIG. 8 is a screen shot of the Setup Update page provided in the first embodiment of the present invention.

When the Update tab 410 (see FIG. 4) is selected, the software displays the Update Options page 700, as shown in FIG. 7. As mentioned previously, the update function controls how often new addresses are loaded into the Sponsor DB 102. As shown, this page allows the Sponsor to name update options(via field 702), whether such updates are automatic or manual (via buttons 704), and how often such updates recur (via the various check boxes and fields in the recurrence area 706). Additionally, when the Setup button 708 is selected, the Setup Update page 800 is presented to the Sponsor, as shown in FIG. 8. This page 800 enables the Sponsor to specify a SQL query. As discussed previously, SQL queries are well known in the art, and the present invention is not limited to using SQL queries in order to interface with the Sponsor DB 102.

Figure 9:
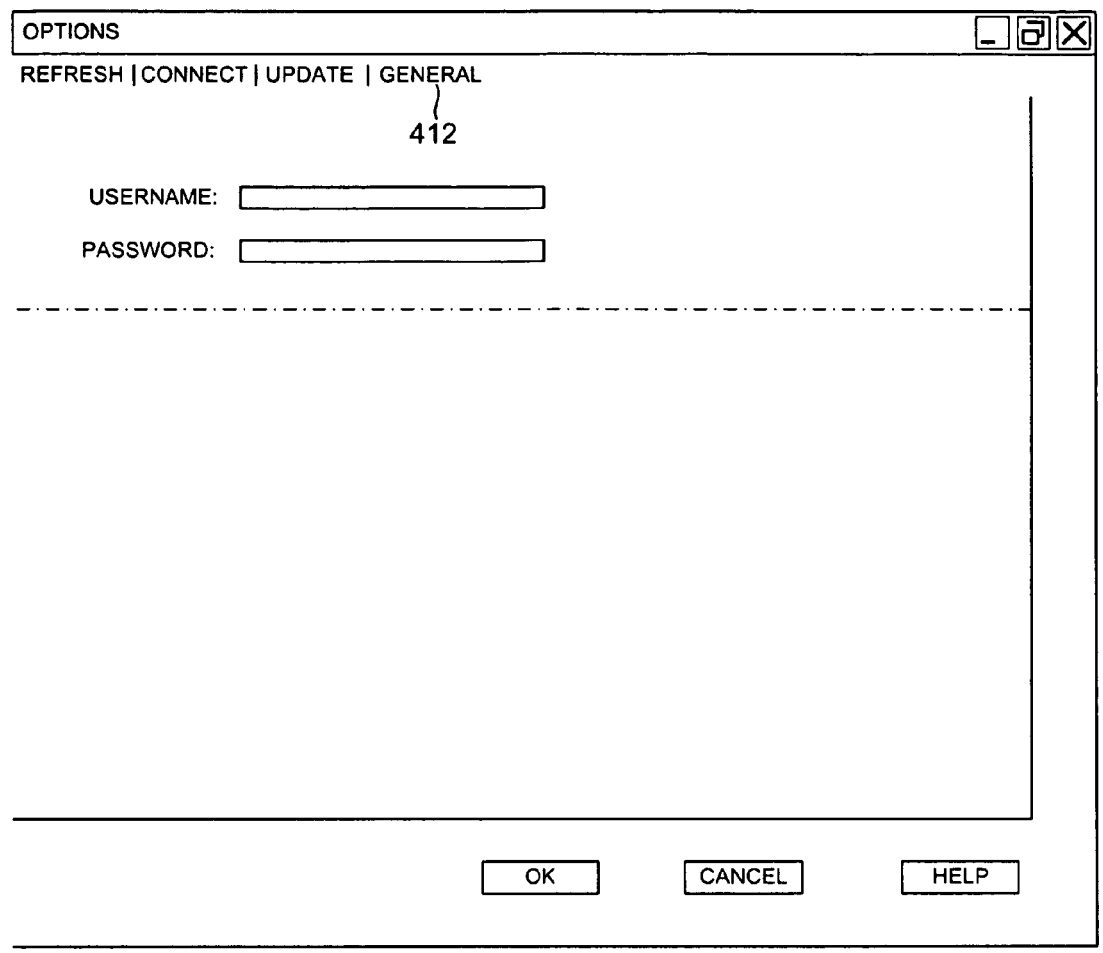
FIG. 9 is a screen shot of the General Options page provided in the first embodiment of the present invention.

The General Options page 900, as shown in FIG. 9, is presented when the Sponsor selects the General Tab 412. As shown, this page allows the Sponsor to specify a username and password, which are utilized by the present invention to ensure the Sponsor is authorized to utilize the system.

Figure 10:
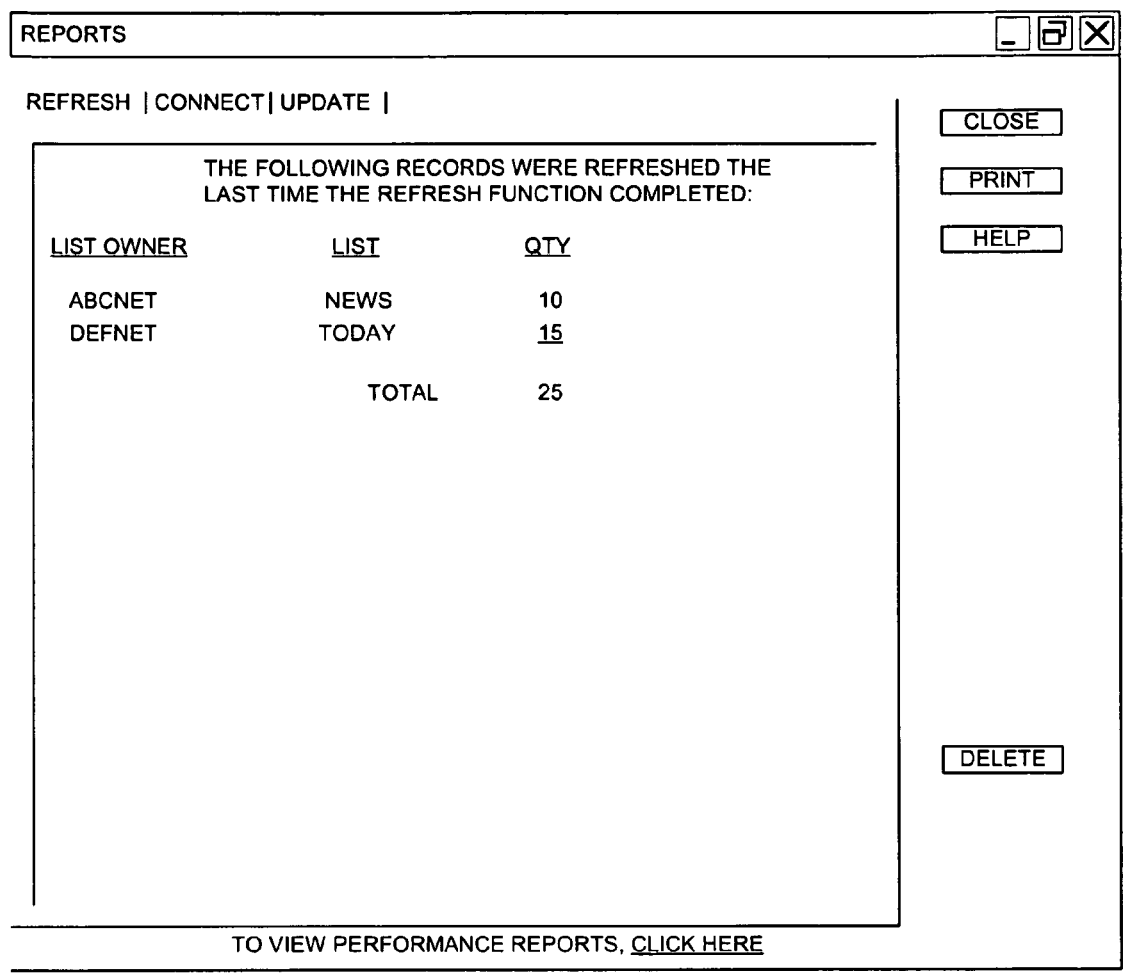
FIG. 10 is a screen shot of the Refresh Report page provided in the first embodiment of the present invention.
Figure 11:
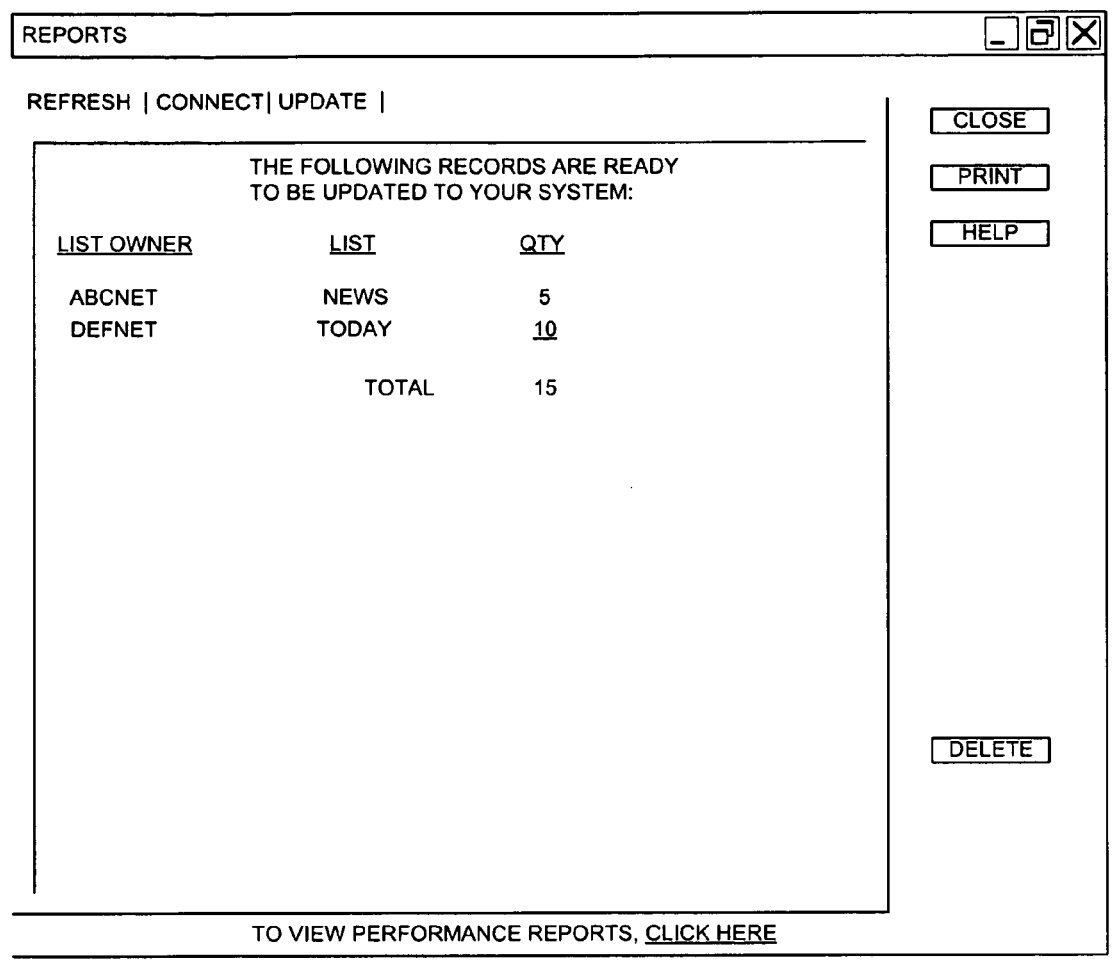
FIG. 11 is a screen shot of the Connect Report page provided in the first embodiment of the present invention.
Figure 12:
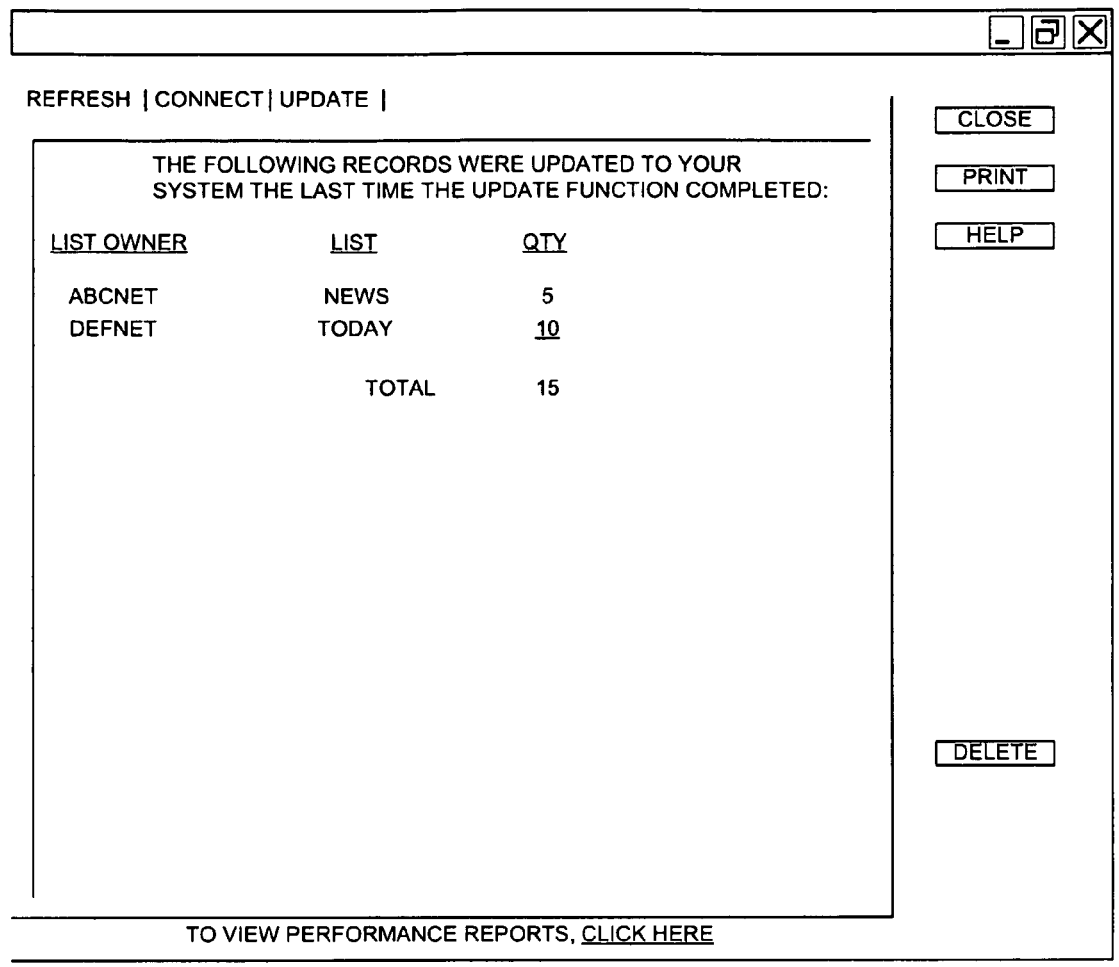
FIG. 12 is a screen shot of the Update Report page provided in the first embodiment of the present invention.

In addition to providing interfaces by which the Sponsor may define how often Refreshes, Connects, and Updates occur, the software also allows a Sponsor to view various reports by selecting the Reports button 304 from the home page 300, as shown in FIG. 3. When the Reports button 304 is selected, the software presents the Reports Refresh page 1000, as shown in FIG. 10. This page 1000 presents to the Sponsor how often and how many records were refreshed during previous refresh sessions. The software may be configured to save such reports and allows the Sponsor to print the reports, and delete the reports as desired. Similarly, Connect Reports and Update Reports are provided by the software, as shown in FIGS. 11 and 12, respectively.

Figure 14:
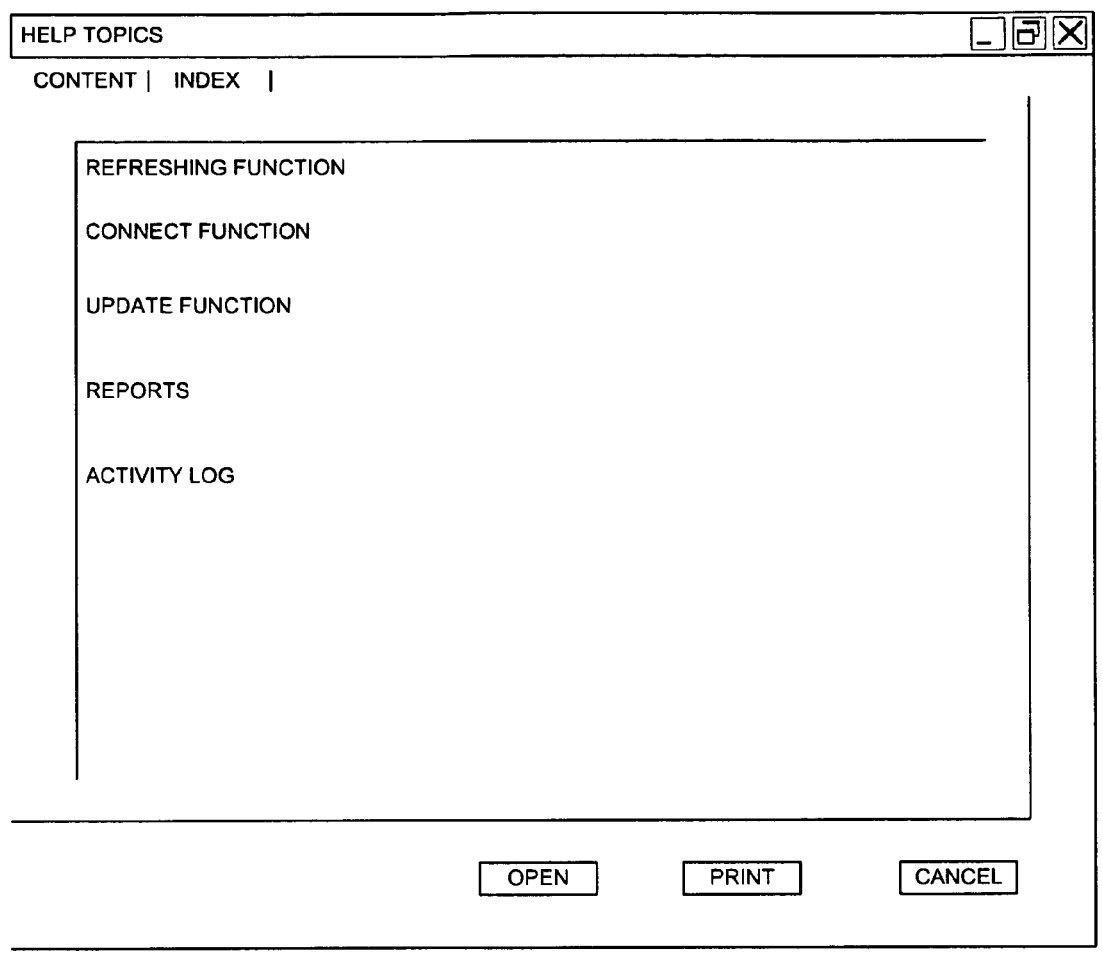
FIG. 14 is a screen shot of the Help Topics page provided in the first embodiment of the present invention.
Figure 15:
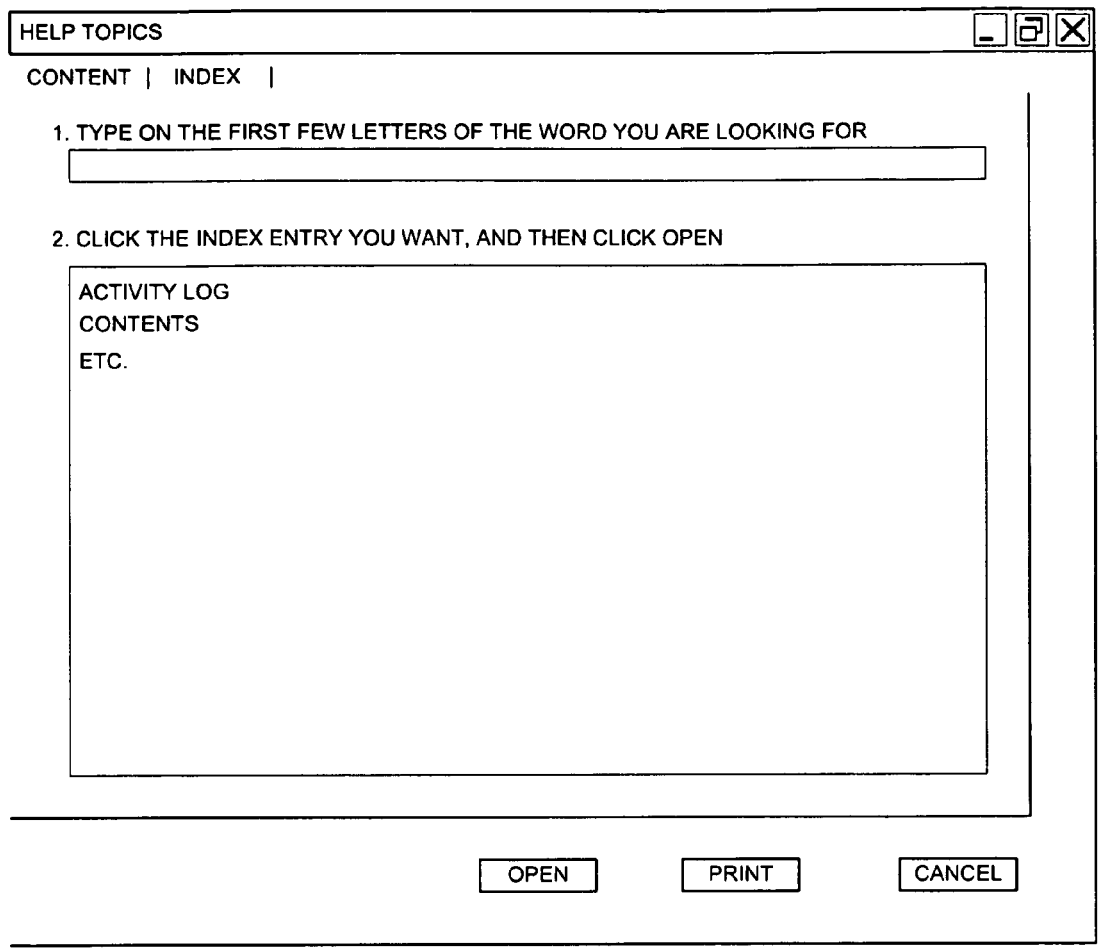
FIG. 15 is a screen shot of the Help Index page provided in the first embodiment of the present invention.

Additionally, when the Activity Log button 306 (see FIG. 3) is selected, the software displays the Activity Log page 1300, as shown in FIG. 13. The Activity Log page 1300 presents to the Sponsor information about previous functions performed by the RM 104. As is common in the art, the Sponsor may obtain additional information by selecting a function, for example, by recalling records from a memory device or by selecting a hyper-link, Further, FIGS. 14 and 15 illustrate the Help pages provided by the software. As is common in the industry, the software includes Help features, printing features, data saving features, and other common features.

Figure 16A:
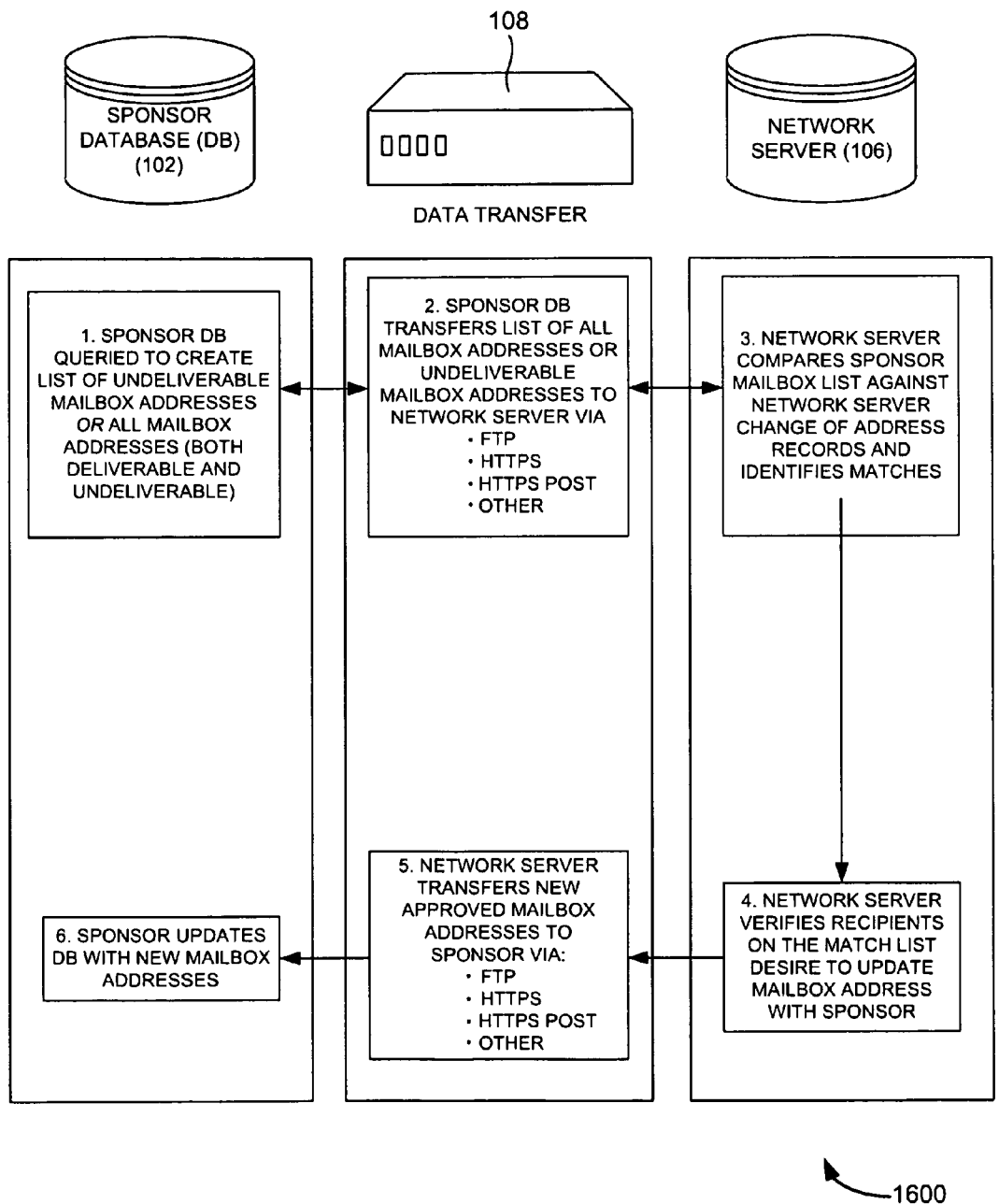
FIG. 16A is a schematic representation of the system and process by which a Sponsor is provided with updated e-mail addresses for a second embodiment of the present invention.

Referring now to FIG. 16A, a second embodiment of a system 1600 of the present invention is shown. In this embodiment, the system 1600 includes the Sponsor Database 102 and the Network Server 106. Additionally, a data transfer means 108 is utilized to coordinate mailbox/address information and other information between the Sponsor DB 102 and the Network Server 106. It is to be appreciated that the data transfer means may be resident on the Sponsor DB 102, the Network Server 106 or anywhere else along the communications path therebetween. The process by which this embodiment of a system of the present invention accomplishes the updating and notification of mailbox/address change information is also shown in FIG. 16A. Specifically, in Step 1, the Sponsor DB 102 receives a query to create a list of undeliverable mailboxes/addresses and/or all mailboxes/addresses. It is to be appreciated that this query may be automatically generated (for example, on a periodic or otherwise recurring basis), may be generated by a system administrator (for example, upon entry of a command), may be generated upon the occurrence of certain events (for example, a threshold of missed addresses is exceeded), or based upon any other basis.

The list generated by the Sponsor DB 102 is then transferred to the Network Server 106 (Step 2). The list generated by the Sponsor DB 102 may be transferred from a suitable data repository, a recipient's system or anywhere else (including files maintained by the Network Server on behalf of the Sponsor). The list generated by the Sponsor DB 102 may be communicated via any known file or information transfer technique including, but not limited to, FTP, HTTPS, HTTPS Post and others.

Upon receipt of the list and the new addresses, the Network Server 106 compares the Sponsor mailbox/address list against the Network Server change of address records and identifies matches (Step 3). The Network Server 106 verifies recipients on the match list desire to update their mailbox/address with the Sponsor associated with the Sponsor DB 102. It is to be appreciated that these notifications may be in any format desired and/or compatible with a user device associated with the mailbox/address (Step 4). For example, an e-mail mailbox change may result in a verification occurring with the Recipient via an e-mail message. Similarly, a voice mail change may result in a verification occurring with a voice message. Thus, any type of verification message may be supported by this embodiment.

When approval, if required, is obtained from the recipient, the Network Server 106 suitably transmits the new approved mailboxes/addresses to the Sponsor via any known communication systems and/or protocols including, but not limited to FTP, HTTPS, HTTPS Post and others (Step 5). Upon receipt of such updates, the Sponsor suitably updates their database(s) with the new mailbox/address and communication of information from the Sponsor to the recipient at the new mailbox/address may recommence (Step 6). In short, FIG. 16A illustrates an embodiment of a system and process of the present invention which does not utilize or depend upon a Reconnection Manager to provide updates of recipient mailboxes/addresses.

Figure 16B:
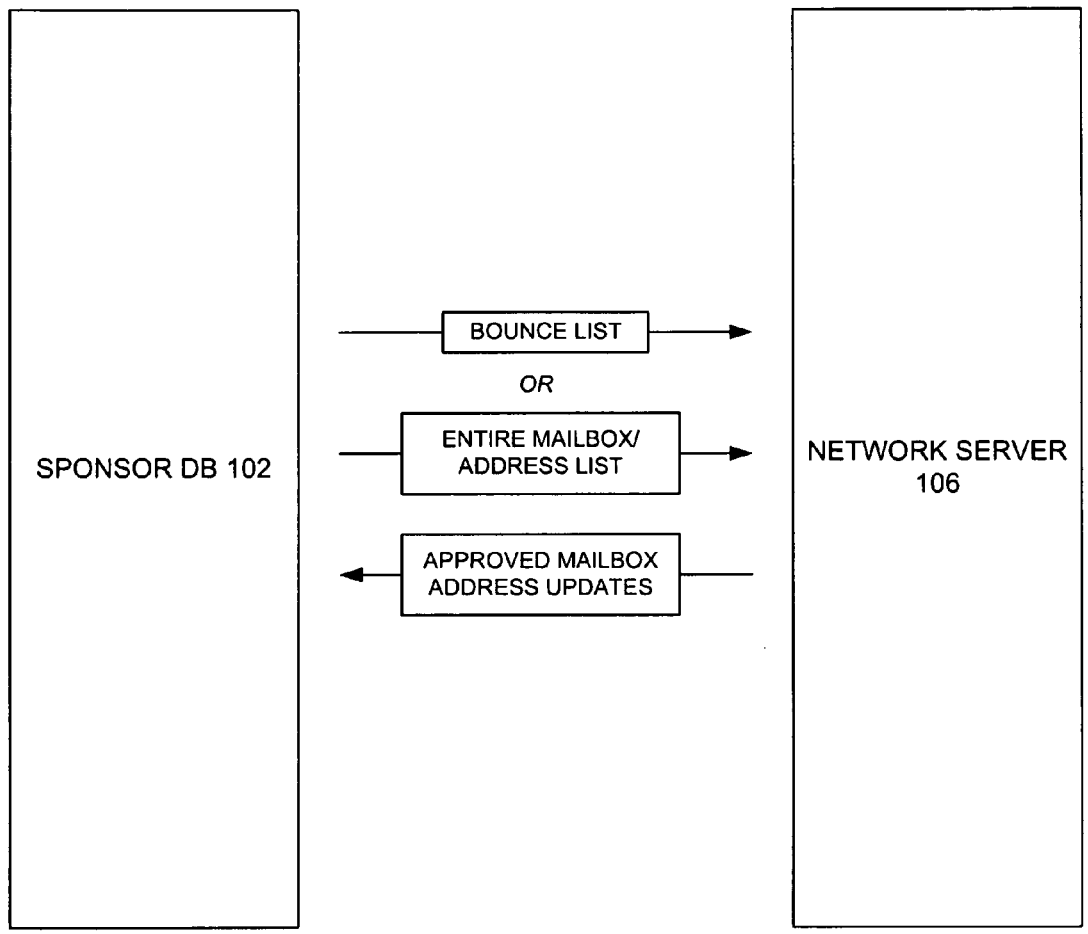
FIG. 16B is a schematic representation of the various data exchanges and processes which occur between a Sponsor and a Network Server for the second embodiment of the present invention.

FIG. 16B provides another illustration of the data flows that occur in this embodiment between the Network Server 106 and the Sponsor DB 102. As shown, the Sponsor DB 102 may be configured to communicate the bounce list (i.e., a listing of mailboxes/addresses for which the Sponsor is receiving return rejection notifications) and/or the Sponsor's entire mailbox/address listing to the Network Server 106. In response thereto, the Network Server 106 communicates the approved mailbox/address updates which are utilized by the Sponsor to reestablish communications with the recipient.

Figure 17A:
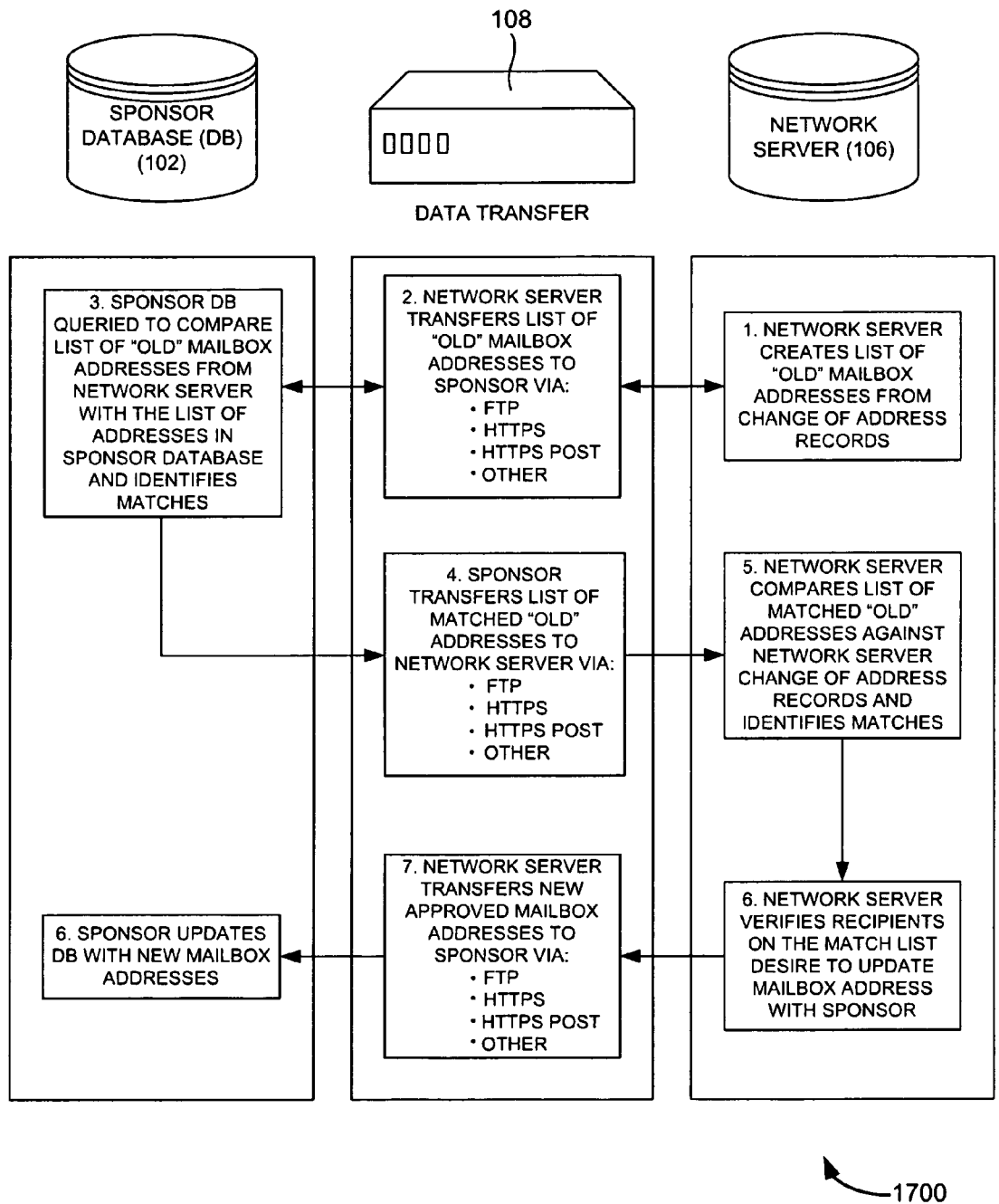
FIG. 17A is a schematic representation of the system and process by which a Sponsor is provided with updated e-mail addresses for a third embodiment of the present invention.

Referring now to FIG. 17A, another embodiment of a system 1700 and process for updating mailboxes/addresses for a recipient with a Sponsor is shown. As shown, the system 1700 includes the Sponsor DB 102 and the Network Server 106 and a communications means. The process by which this embodiment accomplishes the updating and notification of mailbox/address change information is also shown in FIG. 17A. Specifically, in Step 1 the Network Server 106 creates a list of "old" mailboxes/addresses from a compilation of change of address records. This compilation may be generated by the Network Server 106 at any time, and may include as few (including only one) or as many records as desired. Further, the compilation may be based upon any event.

Upon creation of the compilation of "old" mailboxes/addresses, the Network Server 106 communicates the compilation to the Sponsor DB 102 via any desired file transfer methodology or protocol including, but not limited to, FTP, HTTPS, and HTTPS Post (Step 2). The Sponsor DB 102 then compares the list of "old" mailboxes/addresses against a list of mailboxes/addresses maintained in the Sponsor DB 102 (or a database accessed by the Sponsor for such purposes) and identifies matches (Step 3). The resulting matches are transferred to the Network Server 106 in a suitable format/protocol (Step 4).

Upon receipt of the matches, the Network Server 106 then compares the matched entries on the Sponsor list with Network Server change of address records and identifies the matches (Step 5). The Network Server 106 verifies the recipients identified on the match list desire to update their mailboxes/addresses with the Sponsor (Step 6). This verification process may be accomplished in advance (by having the user specify those addresses with whom they desire to update their mailboxes/addresses), as the comparisons are performed, or at another time, as previously discussed hereinabove. Further, such verifications may include sending e-mails or other messages to recipients in order to obtain each of the recipient's affirmation to so update the Sponsor with the new mailbox/address information.

Upon receiving such verification and/or affirmation (when necessary), the Network Server 106 transfers the new mailbox/address information, for the recipients, to the Sponsor DB 102 (Step 7). The Sponsor updates the Sponsor DB 102 and the sending of e-mails to the recipient may resume with the use of the new mailbox/address information.

Figure 17B:
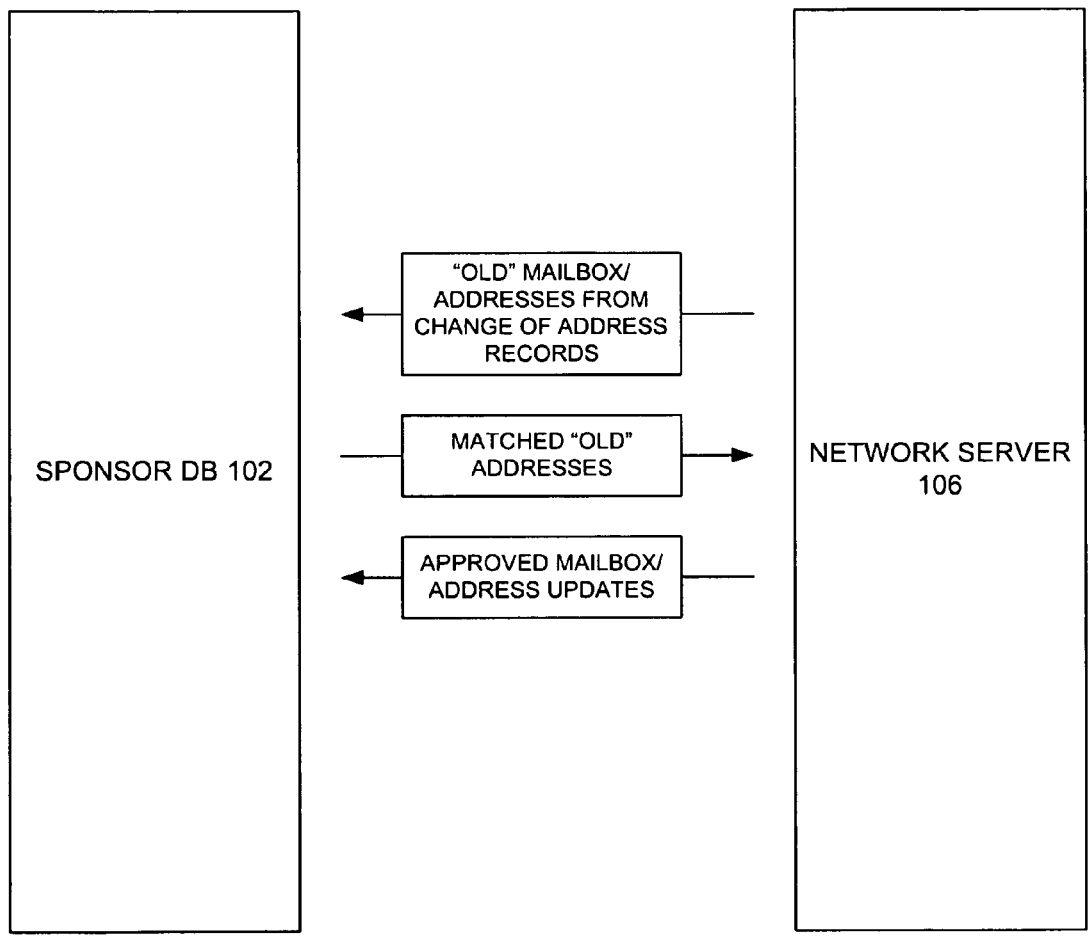
FIG. 17B is a schematic representation of the various data exchanges and processes which occur between a Sponsor and a Network Server for the third embodiment of the present invention.

FIG. 17B provides another illustration of the data flows that occur between the Network Server 106 and the Sponsor DB 102 for this embodiment. As shown, the Network Server 106 communicates "old" mailbox/address information, developed from change of address records, to the Sponsor DB 102. In response thereto, the Sponsor DB 102 identifies and communicates those "old" addresses which match records in their system (i.e., those "old" addresses for which the Sponsor DB 102 needs updates). In response thereto, the Network Server 106 communicates the approved mailbox/address updates which are then utilized by the Sponsor to reestablish communications with the recipient. As such, it is to be appreciated that the functionality of updating mailboxes/addresses may be accomplished in various embodiments by the present invention. Additionally, as provided for with the first embodiment, various security features (including encrypted data transmissions), help features and other features may be provided in conjunction with any of the embodiments of the present invention.

Figure 18:
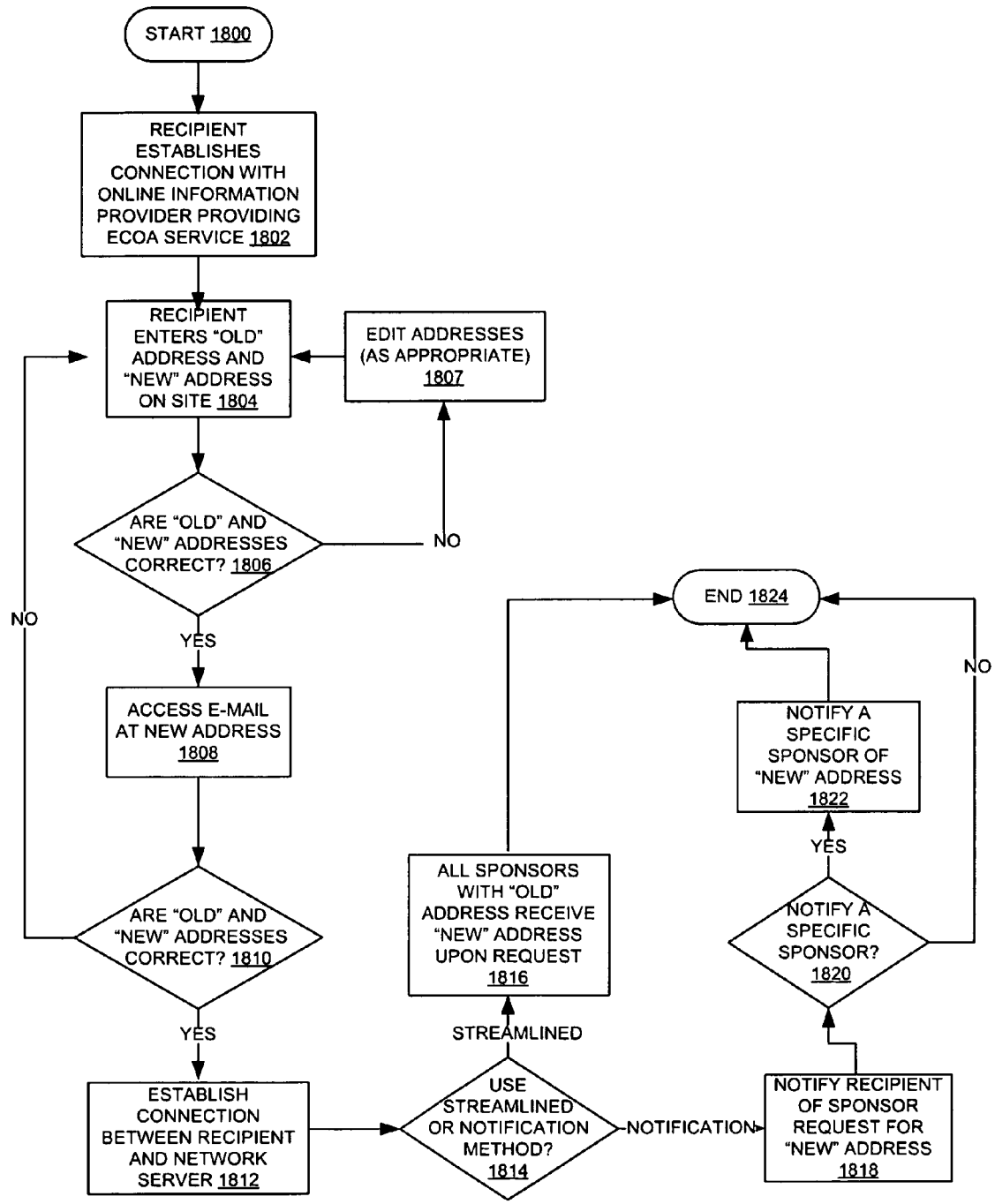
FIG. 18 is an illustrated process flow for a recipient registration process utilized for one embodiment of the present invention.
Figure 19A:
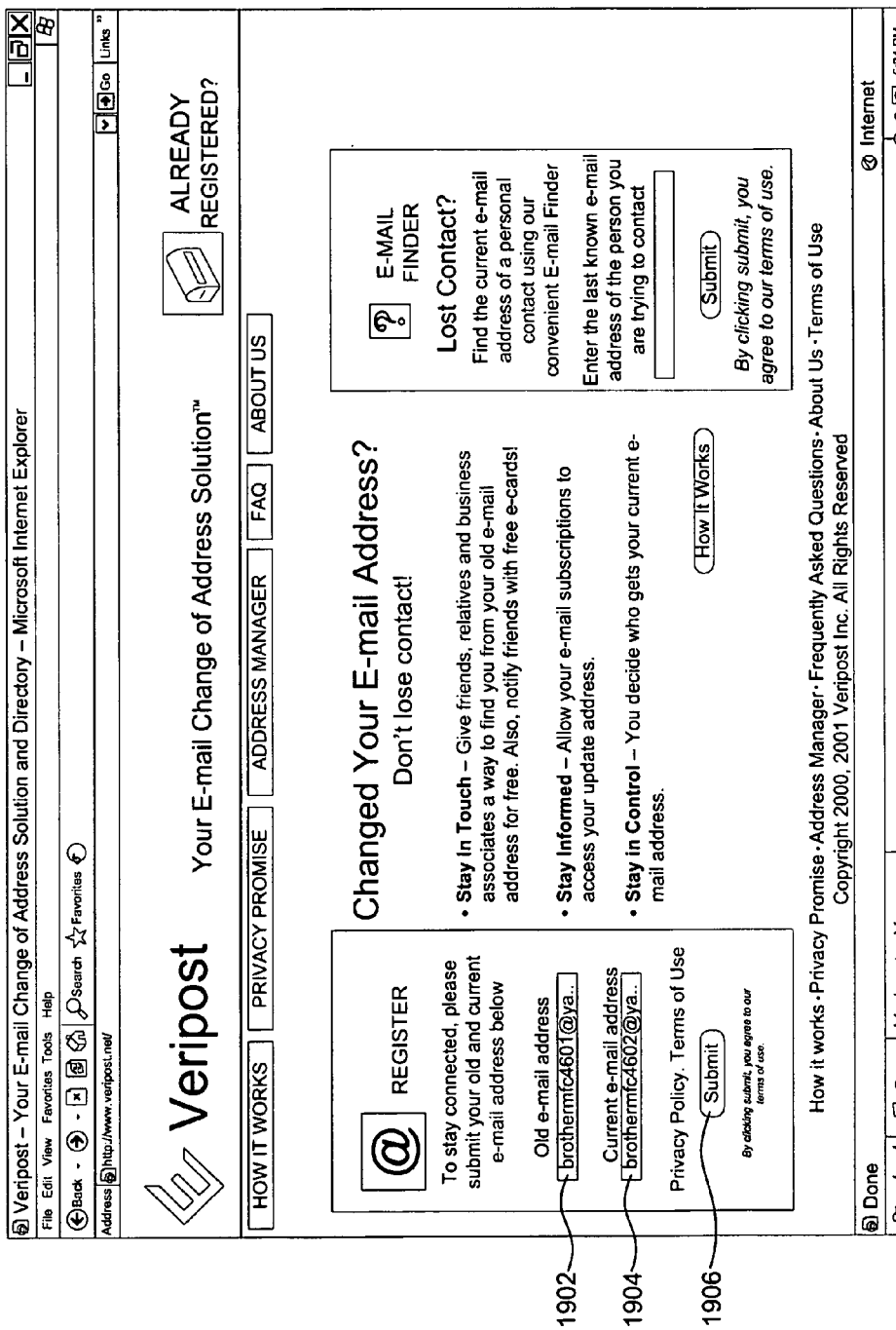
FIG. 19A is a screen shot of a first web page, accessed via an Internet site presented by a Network Server, at which a recipient may register an old address and a new address for one embodiment of the present invention.

Another feature provided by the present invention, and alluded to above, is the process by which a recipient can register with a Network Server to process mailbox/address changes. As shown in FIGS. 18 and 19A-19F. With reference to FIGS. 18 and 19A, the process by which a recipient begins to register their old mailbox/address and new mailbox/address with the Network server is shown. For the embodiment shown, this process begins when the user establishes a connection with an online information provider (which may include a Network Server) providing the ECOA services specified herein (Step 1802). One example of such a site 1900 is provided by VERIPOST™ (see FIG. 19A). As shown, this site 1900 provides a recipient with a text box 1902 for inserting an "old" e-mail address (or other address) and a text box 1904 for inserting a "new" e-mail address (Step 1804).

Figure 19B:
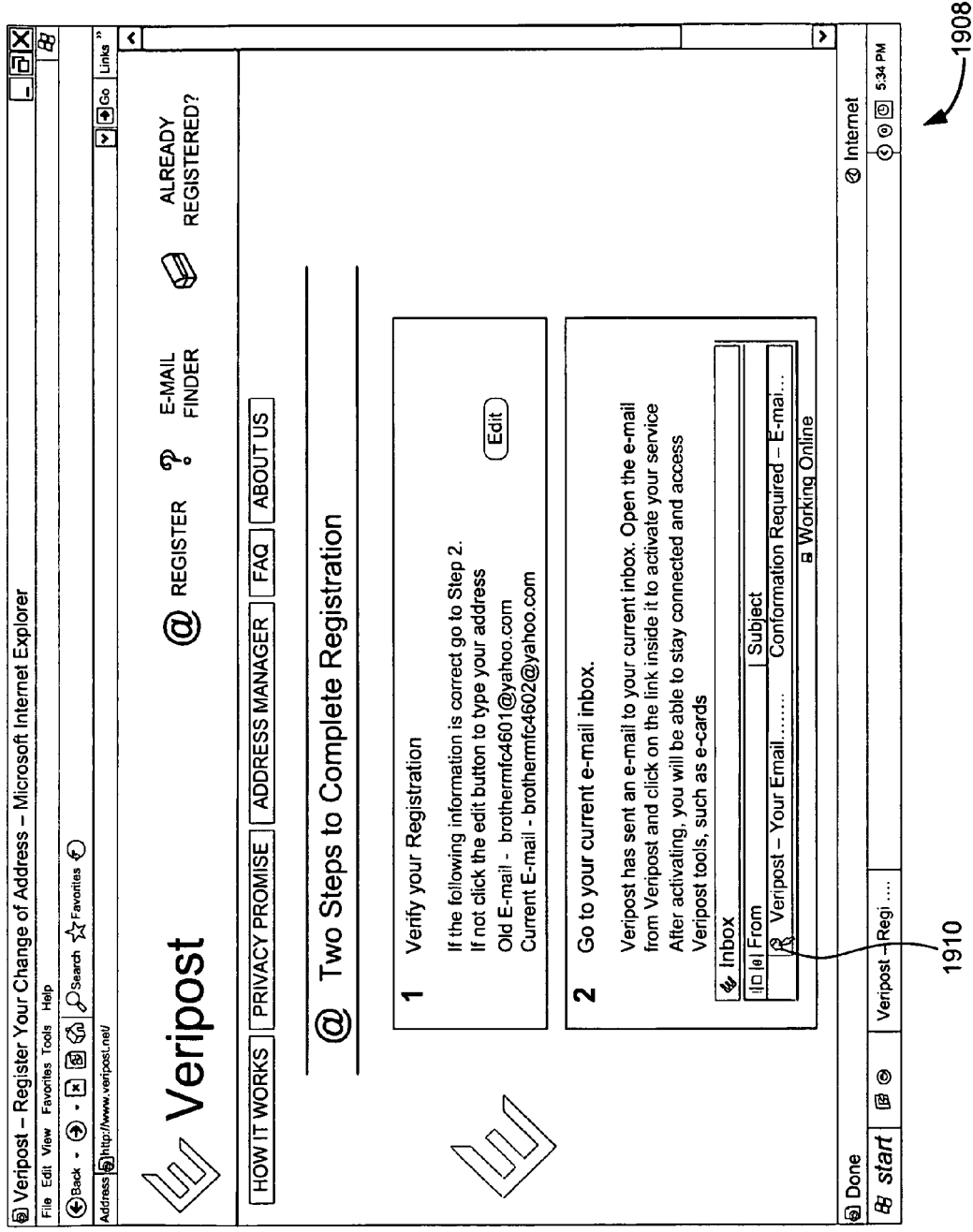
FIG. 19B is a screen shot of a second page, provided by the Internet site shown in FIG. 19A, which provides a recipient with registration and verification information for one embodiment of the present invention.

Upon selecting the Submit button 1906, the process continues with the ECOA service presenting the Verification screen 1908, as shown in FIG. 19B. On this screen 1908, the recipient may verify the information submitted is correct (Step 1806) and correct any errors in the "old" or "new" addresses (Step 1807). Additionally, this screen directs the recipient (see the window 1910) to access an e-mail sent by the online information provider to the "new" e-mail address (or other address, when addresses utilized for communications other than e-mail are changed) (Step 1808).

Upon accessing the e-mail sent by the online information provider, as shown in FIG. 19C, the recipient is presented with the option of verifying the "old" address and the "new" address are correct by selecting the link 1912 (Step 1810). The recipient may also modify the submitted addresses and repeat the process flow by selecting the link 1914 and entering new information; thereby effectively repeating the verification process shown in steps 1804–1810. This step enables the Network Server to verify that the addresses submitted are legitimate. Additionally, it is to be appreciated that this verification step may also include sending a confirming e-mail to the "old" address, thereby ensuring the recipient actually had access to the account associated with the "old" address (as shown in FIG. 19F).

Upon the recipient selecting the verified link 1912, the process continues with establishing an on-line connection (or other connection) between the recipient and the online information provider (for example, Veripost) (Step 1812) at which instance the privacy screen 1915 is presented to the recipient, as shown in FIG. 19D. As shown, this screen 1915 enables the recipient to specify the type of privacy they desire with regards to updating Sponsors with the "new" address (Step 1814). As shown, two options are provided in this embodiment. These include the streamlined option 1916, wherein the "new" address is released to requesters (i.e., Sponsors) who already know the recipients "old" address (Step 1816), and the notification option 1918, wherein the recipient decides on a case-by-case basis as to whether a Sponsor is to receive the "new" address (Steps 1818–1824). The notification option, in this embodiment, utilizes an e-mail sent by the provider and the selection of a "yes" or "no" option, as the acceptance/rejection mechanism. It is to be appreciated that other methods for accepting/rejecting a Sponsor's request for a "new" address may also be utilized in various other embodiments of the present invention.

Figure 19E:
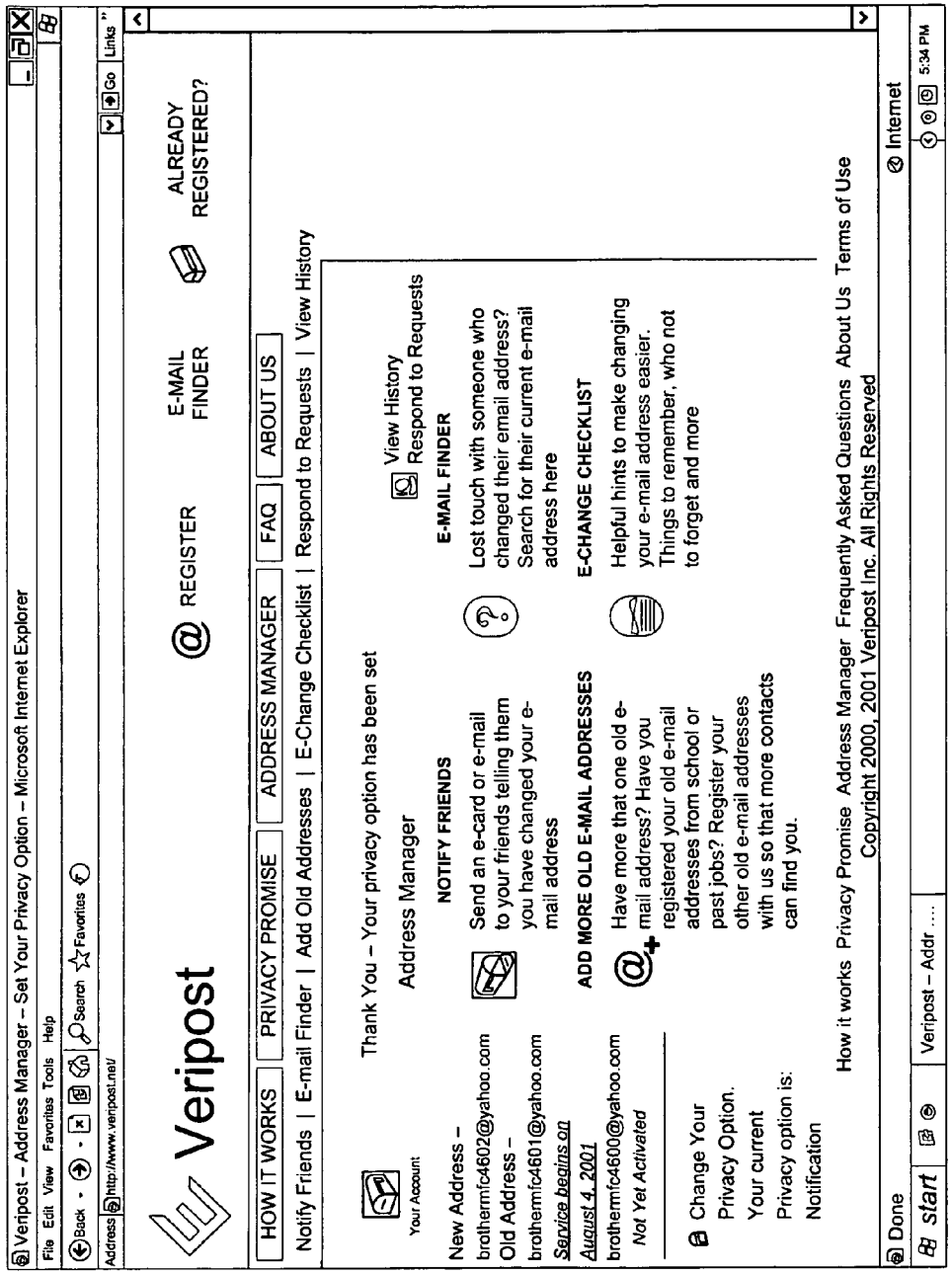
FIG. 19E is a screen shot of an Address Manager page provided by the Internet site at which the recipient may select additional mailbox/address features provided by the Network Server for one embodiment of the present invention.

As shown in FIG. 19E, the online information provider may also be configured to provide additional services, such as notifying friends (for example, all of the contacts identified on a recipient's MICROSOFT OUTLOOK® contact folder), searching for updated e-mail addresses for others for whom the recipient desires to receive updated information, and other helpful hints.

Referring now to FIGS. 20–26, various other methodologies by which a recipient may specify a change in address with an ECOA service provided by a Network Server are also provided by the present invention. As shown in FIG. 20, one such method enables a Sponsor (for example, an e-Newsletter) who has registered with the Network Server to optionally update their privacy policy, as necessary, to be in accordance with any privacy policies established by the Network Server (Step 2001). The recipient, for example, while viewing a web page provided by the Sponsor, then enters address update information including the "old" address and the "new" address in fields or screens provided on the Sponsors site (Step 2002). Upon entering this information (i.e., opting into the ECOA service) the Sponsor sends an update to the Network Server which then updates its databases to reflect the change of address information (Step 2003). The updated address information for the recipient may then be utilized by other Sponsors who are part of the network provided by the Network Server to update their own databases (Step 2004) and thereby continue to provide messages to the recipient at the "new" address (Step 2005). As such, this method allows a recipient to update addresses and/or other information for all Sponsors (from whom the recipient is currently receiving messages) without having to visit a specific web page or online service provider.

Figure 21:
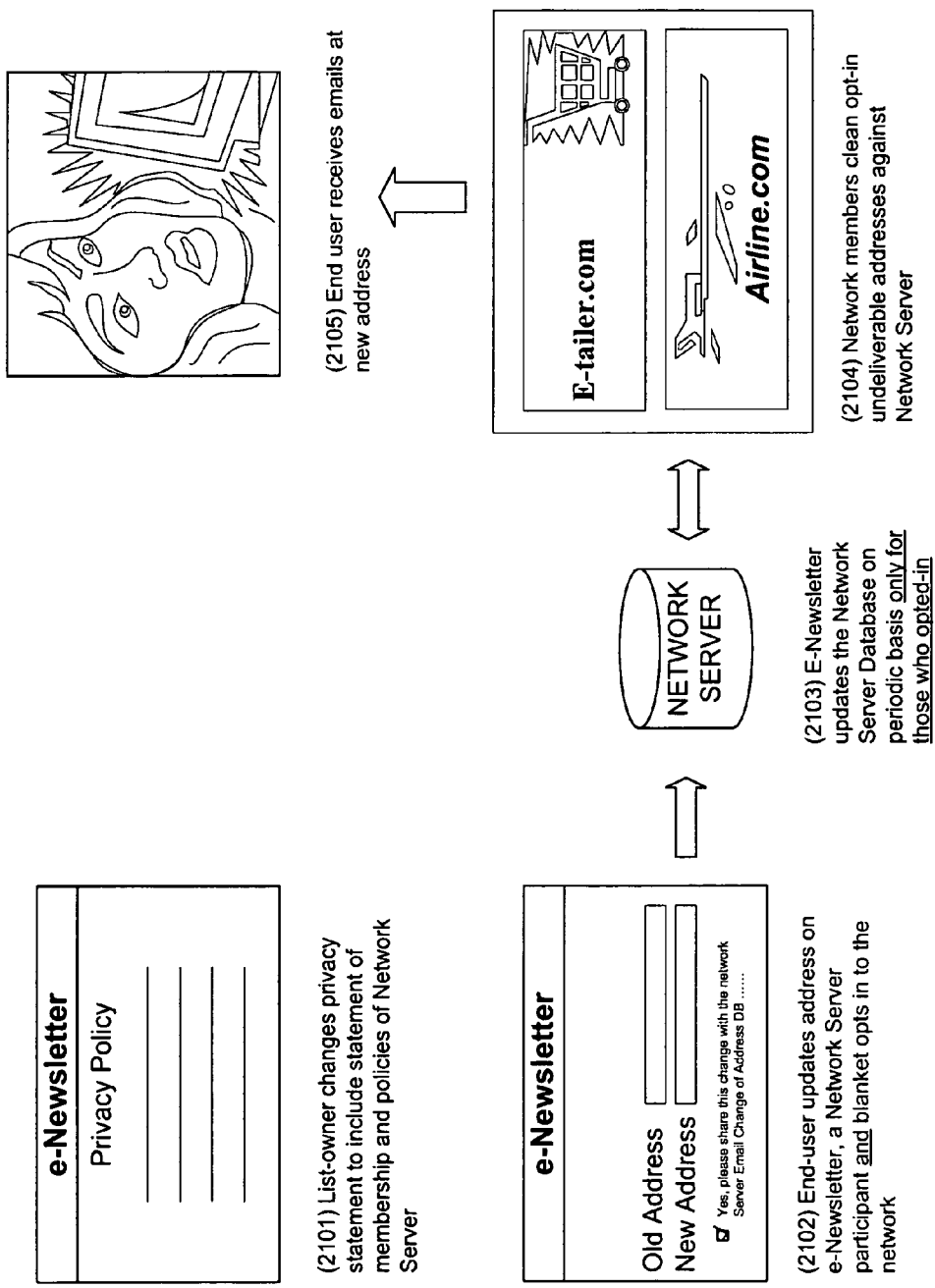
FIG. 21 is an illustrated flow diagram depicting a modification of the process shown in FIG. 20 where, in addition to specifying an old address and a new address on a Sponsor's web site, the recipient also specifies whether such address information is to be shared with the Network Server and with other Sponsors for another embodiment of the present invention.

As shown in FIG. 21, another method for registering a recipient with a Network Server is provided. As shown, a check box may be included on a screen or data entry box (Step 2102) on which a recipient enters an "old" and a "new" address. The method then operates as provided for in FIG. 20, except the Sponsor updates the Network Server with only those recipients who have affirmatively opted in by checking the checkbox or otherwise similarly so indicating.

Another method for registering a recipient with a Network Server is shown in FIG. 22. In this method, the process proceeds basically as provided for in FIGS. 20 and 21, however, the process includes an additional Step 2204 wherein the recipient opts into the Network Server's ECOA service upon receiving an e-mail from a Sponsor, which the recipient has previously notified of the change in mailbox/address. Similarly, in the method shown in FIG. 23, the recipient is provided the option of selecting each Sponsor, that is registered with the Network Server, that is to be informed of the recipient's new mailbox/address (see Step 2304).

FIG. 24 illustrates another method for registering change of address information with Sponsors via a Network Server. As shown, in this method instead of using an e-mail or other message sent to the recipient, a JavaScript or similar pop-up window appears on the recipient's system. Upon selection of "OK" the recipient registers directly with the Network Server (see Step 2403). As such, this method removes the burden of the Sponsor updating the Network Server. Similarly, FIG. 25 illustrates a registration process wherein the recipient receives a pop-up window that contains a listing of Sponsors which the recipient may designate as receiving the new mailbox/address information (see Step 2503).

FIG. 26 provides another illustration of a registration process supported by the various embodiments of the present invention. As shown, in this method the user updates their address information with a Sponsor (Step 2602), who then updates the Network Server (Step 2603) for all address changes. Other network members then may clean their undeliverable addresses against the updated Network Server database (Step 2604) and send an e-mail or other message to any recipients identified (Step 2605). The recipient can then respond affirmatively or negatively as to whether to continue to receive e-mails or other information from each specific Sponsor. Thus, it is to be appreciated that various methodologies may be utilized by the various embodiments of the present invention to support the registration and updating of mailbox/address information for each recipient, or groups of recipients, with all Sponsors, groupings of Sponsors and/or individual Sponsors. The present invention is not limited to those methodologies described herein and may support any methodology compatible with the systems and processes provided in the present invention.

Referring now to FIGS. 27A and 27B, one embodiment of a process by which registrations are validated by the Network Server is depicted. As shown, this process begins with the recipient registering the "old" and "new" addresses with the Network Server (Step 2702). Any of the above mentioned registration processes or other registration processes may be utilized for this step.

Upon receiving the registration information, the Network Server passes the "old" and "new" addresses through a series of filters and checks to verify that the information received is not invalid or otherwise unacceptable (Step 2703). Some of these filters include verifying whether the domain name specified is valid, verifying whether the address contains improper e-mail addresses (for example, abc@123.com or billclinton@whitehouse.com), whether the addresses contain profanity and/or whether the addresses are RFC 822 compliant. It is to be appreciated, that additional and/or fewer (if any) validity checks and filters may be used by the Network Server as desired for specific applications of the present invention. If a registration fails a filter check, the Network Server rejects the registration (Step 2705) and the process ends (Step 2711).

When the registration passes the filter, the process continues with the Network Server sending an e-mail message or other message (as discussed previously hereinabove) to both the "old" and "new" addresses (Step 2704). This step is provided in order to confirm that the "new" address is valid, to notify the "old" address of the change request and to provide the recipient at the "old" address the opportunity to confirm the address change request or cancel the address change request.

For the validation process used in the present invention, the process continues with the Network Server awaiting receipt of a confirmation from the "new" address (Step 2706). By utilizing a confirmation from the "new" address, the Network Server verifies that the "new" address is valid and also that a recipient can receive messages at the "new" address. A time period is also provided for the recipient to reply, thereby allowing the recipient to designate when the actual switch to the "new" address is to occur by sending the reply at the desired switch time (Step 2707). If a reply is not received from the new address within the designated time period the Network Server does not change the addresses (Step 2709) and the process ends (Step 2711). It is to be appreciated that the time period, during which the Network Server waits for a reply by the recipient from the "new" address, may vary as desired with specific applications of the present invention.

Referring again to Step 2706, when a reply is received by the Network Server from the "new" address, the process continues with the Network Server determining whether the Network Server has also received a confirmation message from the "old" address (Step 2708). As it is foreseeable that the confirmation from the "old" address may be received prior to the confirmation from the "new" address, the Network Server suitably stores such confirmation messages while awaiting receipt of the confirmation from the "new" address. However, for the process shown in FIGS. 27A and 27B, the Network Server does not institute a change of address until a confirmation is received from the "new" address.

When a confirmation has been received from both the "old" and "new" addresses, the Network Server sets the registration status as "A" (Step 2710) and implements the change of address in a database associated with the Network Server (Step 2712). At which instance, the process ends (Step 2711).

When a confirmation has been received from the "new" address but has not been received from the "old" address, the process continues with a determination by the Network Server as to whether a "cancel" message has been received by the Network Server from either the "old" address or the "new" address (Step 2726). If a "cancel" has been received, the Network Server does not change the addresses (Step 2709) and the process ends (Step 2711).

If a "cancel" has not been received, the Network Server determines whether a timer, which was initiated when the validation e-mail messages (or validation message in another format, such as, a voice message sent to an old and a new voice messaging service) were originally sent, has expired (Step 2714). If the timer has not expired, the Network Server resumes waiting for receipt of a reply from the "old" address, receipt of a "cancel" or the expiration of the allotted time on the timer, whichever occurs first (Steps 2708, 2726 and 2714, respectively). If the timer has expired, the Network Server designates the registration status as a "B" (Step 2722) and implements the change of address on the Network Server (Step 2712).

Next, the Network Server determines whether a "cancel" has been received from the recipient via the "old" address or the "new" address (Step 2716). If a "cancel" has been received, the Network Server cancels the implementation of the change of addresses (Step 2724) and the process ends (Step 2711).

If a "cancel" has not been received, the Network Server determines whether the "old" address is still active (Step 2718). If the "old" address is no longer active, the Network Server ends the validation process (Step 2711).

If the "old" address is still active (Step 2718), the Network Server periodically resends an e-mail message to the "old" address notifying the recipient of the change of address (Step 2720). At this point, the Network Server continues to loop through process Steps 2716, 2718, and 2720 until either a cancel response is received (Step 2716) or the "old" address becomes inactive.

As such, the process in FIGS. 27A and 27B provides one process by which a Network Server may validate a change of address request. The process further provides for the designation of changed address records as either an "A" or a "B", which Sponsors may utilize to determine the status of the change of address record request and possibly send messages to both the "old" and "new" addresses or either address separately.

Referring now to Table 3, below, the process by which the Network Server determines whether a given Sponsor is to receive a "new" address is provided. As shown, the Network Server determines whether a confirmation has been received from the recipient via the "new" address and/or the "old" address. The Network Server also determines whether the "new" address and the "old" address are active. Based upon a result of these determinations, and utilizing the algorithm shown in FIG. 3, the Network Server determines whether to make the change of address information available to Sponsors. It is to be appreciated, however, that Table 3 illustrates the algorithm utilized only when any Sponsor is allowed to access "new" addresses and does not apply to the situation where individual Sponsors are approved or disapproved for receiving the "new" address.

TABLE 3

Address Update Record Addition Algorithm

| Old Address | | New Address | | |
|---|---|---|---|---|
| Active Address? | Confirmation Received? | Active Address? | Confirmation Received? | Make Available |
| NO | — | NO | — | NO |
| YES | NO | YES | NO | NO |
| YES | YES | YES | YES | YES |
| NO | — | YES | NO | NO |
| YES | NO | YES | YES | YES |
| YES | YES | NO | — | NO |
| NO | — | YES | YES | YES |
| YES | NO | NO | — | NO |
| YES | YES | YES | NO | NO |

Additionally, various modules are also utilized in the various embodiments of the present invention to provide the features and functions specified herein. Table 4 provides a summary of the key modules utilized in the various embodiments of the present invention. It is to be appreciated that such modules are commonly implemented in most Internet compatible applications and such commonly known systems and techniques may be utilized to provide such modules.

TABLE 4

Summary of Key Modules

| Module | Key Functionality |
|---|---|
| Database/Backup | Central repository for address change update, undeliverable lists from Sponsors, email mailing lists from Sponsors;<br>Provides matching and cleaning functions described above;<br>In some versions of the solution displayed in Table 3, the database will only allow matching and cleaning for lists that the recipient has approved for address update;<br>Keeps transaction data for billing purposes; and<br>Backs-up data to provide for emergency restoration of data. |
| Data Feeds System | Receives data from Sponsors; and<br>Sends data to Sponsors. |
| Email System | Sends emails to recipients and other users;<br>Receives confirmation responses from recipients;<br>Interfaces with database to flag address change records as available to be used for "cleaning"; and<br>In some versions of the solutions displayed in Table 3, the email system will also flag which lists the recipient has approved for update. |
| Consumer Facing Website | Allows the recipient to query how their update data has been used (i.e., which lists have been informed of the update change);<br>Allows the recipient to query a list of Sponsors to determine if lists to which they subscribe are members of the network; and<br>Allows the recipient to suggest lists to be added to the network. |
| Administrative/network member reporting website | Allows the Sponsor to query the database to determine (by period of time):<br>The number of matches/cleans for their undeliverable list;<br>The number address change records that they have provided to the network;<br>The number of these address change records that are unique to their list; and<br>Their current billing status. |

While the present invention has been described in the context of various embodiments of a system implemented by a Sponsor to keep track of and update e-mail addresses (and mailboxes/address for other forms of electronic messaging), it is to be appreciated that the present invention may also be configured, in an alternative embodiment, such that data records tracking Sponsors from whom a recipient commonly receives electronic messages may be compiled and stored. These Sponsor records may be utilized by the recipient to identify those Sponsors to whom a new e-mail or other message should be sent informing the Sponsor of the recipients new mailbox/address. In such an embodiment, the records of Sponsor mailing lists are not accessed, nor is a centralized clearing house, network based server, reconnection manager, or similar systems or applications utilized. Instead, the recipient's system keeps track of those Sponsors from whom the recipient receives messages/information and the recipient then identifies which Sponsors are to receive the new mailbox/address information. As such, this additional embodiment attempts to maximize recipient privacy and may be popular when recipients are concerned about privacy issues which may arise by identifying to a Network Server 106 those Sponsors from whom a specific recipient receives electronic messages.

Lastly, the present invention has been described in the context of various embodiments of systems, processes and screen displays. It is to be appreciated that the present invention is not limited to any specific system configuration, hardware, software, processes, screen displays, or operational flow and is to be construed as encompassing any system and/or process providing the features and functions covered by the following claims.

The invention claimed is:

1. A system for updating a database containing at least one address for a recipient of an electronic message to be sent from a Sponsor to the recipient, comprising:
   at least one Sponsor database containing a listing of at least one address associated with a recipient;
   a Network Server containing a listing of an old address and a new address for at least one recipient; and
   a reconnection manager connected to the at least one Sponsor database and the Network Server;
   whereupon receiving a request from the at least one Sponsor database for a new address for a recipient, the reconnection manager queries the Network Server for an identification of addresses which have changed since a last request by the reconnection manager to the network server;
   based upon a result of the query to the Network Server, the reconnection manager matches those addresses that have changed with the address requested by the at least one Sponsor database and communicates such matches to the Network Server;
   whereupon receipt of those matches, the Network Server communicates to the reconnection manager an updated list for those recipients permitting the Network Server to update the at least one Sponsor Database; and
   whereupon receipt of a record containing an updated address, the reconnection manager updates the at least one Sponsor database with the new addresses for each recipient permitting the Network Server to provide a new address.

2. The system of claim 1, wherein the Network Server may be accessed from more than one online site by a recipient desiring to update at least one address associated with the recipient.

3. The system of claim 1, further comprising at least one web site provided by a Sponsor via which a recipient registers an old address and a new address with the Network Server.

4. A process that utilizes a clearing house to update a listing of addresses utilized by a Sponsor to send a first electronic message to at least one recipient, comprising:
   receiving from a Sponsor a second electronic message containing at least one request for an updated address for a recipient associated with an old address;
   receiving a listing of recipients with new addresses which have been updated from a clearing house;
   matching the at least one request for an updated address against the listing of recipients with new addresses;
   communicating to the clearing house those recipients identified by a result of the matching;
   obtaining approvals from each recipient identified by the result of the matching to provide the new address to the Sponsor;
   communicating each new address approved by each recipient to the Sponsor; and
   updating a listing of recipient addresses for the Sponsor.

5. The process of claim 4, wherein the first electronic message further comprises one received via at least one mailbox selected from the group consisting of: an e-mail mailbox, a voice message mailbox, a pager mailbox, an instant message mailbox, a mobile telephone message mailbox, and a cable message mailbox.

6. A system for updating a database comprising at least one address for a recipient of an electronic message to be sent from a Sponsor to the recipient, comprising:
   at least one Sponsor database comprising a listing of at least one address associated with a recipient;
   a Network Server comprising a listing of an old address and a new address for at least one recipient; and
   a reconnection manager in communication with the at least one Sponsor database and the Network Server,
   whereupon receiving a request from the at least one Sponsor database for a new address for a recipient, the reconnection manager queries the Network Server for an identification of addresses which have changed since a last request by the reconnection manager to the network server,
   wherein based upon receipt of a result of the query to the Network Server, the reconnection manager compares those addresses that have changed with the address associated with the recipient requested by the at least one Sponsor database and communicates a match to the Network Server,
   whereupon receipt of the match, the Network Server communicates to the reconnection manager an updated address for the recipient if the recipient permits the Network Server to update the at least one Sponsor Database, and
   whereupon receipt of a record comprising an updated address, the reconnection manager updates the at least one Sponsor database with the new address.

* * * * *